(12) United States Patent
Hamel et al.

(10) Patent No.: US 11,401,462 B2
(45) Date of Patent: Aug. 2, 2022

(54) SCINTILLATING HYBRID MATERIAL, ASSOCIATED PART, ASSOCIATED DEVICE AND ASSOCIATED APPARATUS, METHODS FOR PRODUCING OR MEASURING SAME

(71) Applicant: COMMISSARIAT A L'ENERGIE ATOMIQUE ET AUX ENERGIES ALTERNATIVES, Paris (FR)

(72) Inventors: Matthieu Hamel, Cherbourg-Octeville (FR); Guillaume Bertrand, Meyras (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 115 days.

(21) Appl. No.: 16/957,334

(22) PCT Filed: Dec. 20, 2018

(86) PCT No.: PCT/FR2018/053495
§ 371 (c)(1),
(2) Date: Sep. 14, 2020

(87) PCT Pub. No.: WO2019/122773
PCT Pub. Date: Jun. 27, 2019

(65) Prior Publication Data
US 2020/0407626 A1    Dec. 31, 2020

(30) Foreign Application Priority Data

Dec. 24, 2017 (FR) .................................. 1763196
Dec. 24, 2017 (FR) .................................. 1763197
Dec. 24, 2017 (FR) .................................. 1763198

(51) Int. Cl.
C09K 11/02 (2006.01)
C09K 11/06 (2006.01)
G01T 1/20 (2006.01)

(52) U.S. Cl.
CPC .............. *C09K 11/02* (2013.01); *C09K 11/06* (2013.01); *G01T 1/2008* (2013.01); *G01T 1/2018* (2013.01); *C09K 2211/1011* (2013.01)

(58) Field of Classification Search
None
See application file for complete search history.

(56) References Cited

U.S. PATENT DOCUMENTS 4,788,436 A    11/1988  Koechner
5,121,462 A    6/1992   Fabre et al.
(Continued)

FOREIGN PATENT DOCUMENTS

EP    0413010 A1    2/1991
EP    0691549 A2    1/1996
(Continued)

OTHER PUBLICATIONS

Pla-Dalmau et al., "Extruded Plastic Scintillation Detectors" arxiv.org, Cornell University Library, 201 Olin Library, pp. 1-8 (Apr. 1999).
(Continued)

*Primary Examiner* — Edwin C Gunberg
(74) *Attorney, Agent, or Firm* — Browdy and Neimark, PLLC

(57) ABSTRACT

Hybrid material for plastic scintillation measurement comprising:
  a polymeric matrix; and
  a fluorescent mixture incorporated in the polymeric matrix and comprising, with respect to the total number of moles of primary fluorophore in the incorporated
(Continued)

fluorescent mixture, i) from 95.6 molar % to 99.6 molar % of a main primary fluorophore consisting of naphthalene and ii) from 0.4 molar % to 20 molar % of an additional primary fluorophore.

The decay constant of the fluorescence of the hybrid material is intermediate between that of a fast plastic scintillator material and of a slow plastic scintillator material. Further, they can be chosen over a wide range.

The invention also relates to an associated part, device and item of equipment, to their processes of manufacture or their methods of measurement.

20 Claims, 6 Drawing Sheets

(56) References Cited

U.S. PATENT DOCUMENTS

| | | |
|---|---|---|
| 5,420,959 A | 5/1995 | Walker et al. |
| 5,606,638 A | 2/1997 | Tymianski et al. |
| 9,453,160 B2 | 9/2016 | Hamel et al. |
| 9,499,738 B2 | 11/2016 | Matthieu et al. |
| 2004/0104500 A1 | 6/2004 | Bross |
| 2008/0149838 A1* | 6/2008 | Parvin .................. G01S 17/88 250/356.2 |
| 2012/0241630 A1 | 9/2012 | Walker et al. |
| 2014/0332689 A1 | 11/2014 | Van Loef et al. |

FOREIGN PATENT DOCUMENTS

| | | | |
|---|---|---|---|
| EP | 2655546 A1 | 10/2013 | |
| GB | 1377703 A | 12/1974 | |
| WO | 2013076281 A1 | 5/2013 | |
| WO | 2014135640 A1 | 9/2014 | |
| WO | 2015118533 A1 | 8/2015 | |
| WO | WO-2015118533 A1 * | 8/2015 | ............. G01T 1/203 |

OTHER PUBLICATIONS

Pla-Dalmau et al., "Extruding plastic scintillator at Fermilab", 2003 IEEE Nuclear Science Symposium Conference Record, pp. 1-3 (Oct. 2003).

* cited by examiner

| reference | polymeric matrix | % by weight PPO | % by weight napht. | napht./PPO molar ratio | PPO/napht. molar ratio | biexponential tau (ns) | median monoexponential tau (ns) | chi squared |
|---|---|---|---|---|---|---|---|---|
| E174 | St | 0 | 5 | 100.00% | 0.00% | 48.9 (15) + 96.0 (85) | 87.5 | 1.97 |
| E189 | St | 0.1 | 5 | 98.85% | 1.15% | 25.2 (32) + 73.2 (68) | 65.5 | 2.15 |
| E196A | St | 0.2 | 5 | 97.74% | 2.26% | 61.7 (46) + 19.8 (54) | 48.7 | 2.52 |
| E196B | St | 0.3 | 5 | 96.64% | 3.36% | 55.4 (42) + 18.2 (58) | 35 | 4.23 |
| E198A | St | 0.4 | 5 | 95.57% | 4.43% | 57.1 (24) + 18.2 (76) | 28.3 | 3.38 |
| E198B | St | 0.5 | 5 | 94.52% | 5.48% | 49.9 (22) + 16.1 (78) | 23 | 3.82 |
| E198C | St | 0.6 | 5 | 93.50% | 6.50% | 55.3 (14) + 15.6 (86) | 18.8 | 2.92 |
| E198D | St | 0.7 | 5 | 92.50% | 7.50% | 61.9 (10) + 14.7 (90) | 16.8 | 2.75 |
| F15A | St | 0.8 | 3 | 86.62% | 13.38% | 14.3 (95) + 75.4 (5) | 15.5 | 2.25 |
| F15B | St | 0.9 | 3 | 85.19% | 14.81% | 12.8 (92) + 59.2 (8) | 14.3 | 2.05 |
| E166-4 | St/1,4 | 1 | 5 | 89.62% | 10.38% | 11.3 (80) + 38.9 (20) | 14.9 | 3.43 |
| E166-5 | St/1,4 | 2 | 5 | 81.19% | 18.81% | 10.8 | 10.8 | 1.38 |
| E166-6 | St/1,4 | 3 | 5 | 74.21% | 25.79% | 9.6 | 9.5 | 1.17 |
| EJ-200 | PVT | 100 | 0 | 0.00% | 100.00% | 2.54 | 2.54 | 0.74 |
| F24 | St | 0.05 | 3 | 99.04% | 0.96% | 76.9 (78) + 22.2 (22) | 70.3 | 2.11 |
| F30A | St | 0.02 | 3 | 99.62% | 0.38% | 80.2 (80) + 25.7 (20) | 73.7 | 1.92 |
| F30B | St | 0.02 | 3 | 99.62% | 0.38% | 80.2 (80) + 25.7 (20) | 73.9 | 1.92 |

FIG. 1

SCINTILLATING HYBRID MATERIAL, ASSOCIATED PART, ASSOCIATED DEVICE AND ASSOCIATED APPARATUS, METHODS FOR PRODUCING OR MEASURING SAME

TECHNICAL FIELD

The present invention belongs to the field of the measurement of radioactivity by the plastic scintillation technique.

The invention more particularly relates to a material for the measurement by plastic scintillation, to a part comprising the material and to its associated measurement device or item of equipment, to a polymerization composition, to the kits for the manufacture of the material, to the associated manufacturing processes and also to the method for measurement by plastic scintillation using the device.

Technical Background

The plastic scintillation measurement consists in determining the presence and/or the amount of one or more radioactive substances, among others in physics, geology, biology or medicine, for dating, environmental monitoring or control of the nonproliferation of nuclear arms.

In practice, the radioactive substance emitting an ionizing radiation or an ionizing particle (alpha particle, electron, positron, photon, neutron, and the like) is exposed to a scintillating material known as "plastic scintillator" which converts the energy deposit resulting from the radiation/substance interaction into light radiation (known as "radioluminescent" radiation) which can be measured by a photon-electron converter having gain, such as, for example, a photomultiplier.

The plastic scintillator has been known since the middle of the XXth century. It is described, for example, in the document "Moser, S. W.; Harder, W. F.; Hurlbut, C. R.; Kusner, M. R.; *"Principles and practice of plastic scintillator design"*, Radiat. Phys. Chem., 1993, vol. 41, No. 1/2, 31-36" [reference 1] and "Bertrand, G. H. V.; Hamel, M.; Sguerra, F.; *"Current status on plastic scintillators modifications"*, Chem. Eur. J., 2014, 20, 15660-15685" [reference 2]. It is generally provided in the form of a polymeric matrix into which a primary fluorophore, indeed even a secondary fluorophore, is inserted. A fluorophore is a chemical compound capable of emitting visible fluorescence light after excitation by photons or other incident particles. The primary fluorophore and the secondary fluorophore are constituted by an aromatic molecule with fluorescent properties (molecule known as fluorophore) making possible scintillation detection.

The main role of the polymeric matrix is to be a support capable of receiving the energy of the ionizing radiation or of the ionizing particle. After recombination of the excited and/or ionized entities which are then formed, this energy is converted into radioluminescent radiation and then transferred to the primary fluorophore and optionally to the secondary fluorophore, which can increase the wavelength of the radiation emitted by the primary fluorophore in order to improve the detection thereof.

A specific plastic scintillator of phoswich type (anglosaxon neologism resulting from the combination of the terms phosphorus and sandwich, generally translated to mean "sandwich scintillator") was proposed from the beginning of the development of plastic scintillators in the document "Wilkinson D. H., *"The Phoswich—A Multiple Phosphor"*, Rev. Sci. Instrum. 1952, 23, 414-417." [reference 3].

For the purpose of obtaining novel scintillation properties, a phoswich scintillator combines at least two compartments: on the one hand, a compartment comprising a slow scintillator (high fluorescence decay constant, generally comprised between 200 ns and 1000 ns) and, on the other hand, another compartment comprising a fast scintillator (much lower fluorescence decay constant, generally of between 2 ns and 7 ns).

Nevertheless, such a scintillator poses at least one of the following problems:
- the difference between the fluorescence decay constant of the fast compartment and that of the slow compartment is too low: the separation of the scintillation pulses between these stages is then not possible electronically;
- the difference between the fluorescence decay constant of the fast compartment and that of the slow compartment is too great: the scintillation pulse of the slow scintillator can be partially or completely masked in the electronic background noise of the scintillating pulse acquisition device, which can result in erroneous values being obtained;
- the luminescent signal is acquired over a period of time which is typically of approximately 6 to 10 times the fluorescence decay constant of the slow compartment. In the event of a high count rate due to the multiplicity of the ionizing particles or the high intensity of the ionizing radiation in interaction with the phoswich scintillator, the probability of pile-up (that is to say two pulses present in the same acquisition time window) of the scintillation pulses becomes increasingly high. For this reason, it might be that several pulses appear in the same acquisition time window, which results in rejection of the pile-ups by a phenomenon of saturation of the acquisition electronics, and thus in an underestimation of the count rate.

DESCRIPTION OF THE INVENTION

One of the aims of the invention is thus to avoid or alleviate one or more of the disadvantages described above by providing a novel type of constituent material of a plastic scintillator referred to as "hybrid material".

The present invention relates to a hybrid material for plastic scintillation measurement comprising (indeed even consisting of):
- a polymeric matrix; and
- a fluorescent mixture incorporated in the polymeric matrix and comprising, in a molar concentration with respect to the total number of moles of primary fluorophore in the incorporated fluorescent mixture:
  i) from 80 molar % (more specifically 80.0 molar %) to 99.6 molar % of a main primary fluorophore consisting of naphthalene; and
  ii) from 0.4 molar % to 20 molar % (more specifically 20.0 molar %) of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns, and the fluorescence quantum yield in a nonpolar solvent of which is greater than 0.2, typically comprised between 0.2 and 1; preferentially greater than 0.5, typically comprised between 0.5 and 1.

The hybrid material of the invention can also exclude certain compounds, among others when this material is employed according to the invention described below, among others for the part, the device, the item of equipment and their associated processes. More particularly, it does not comprise one or more of the following compounds, in particular with respect to the total weight of material:

- a polymerization initiator, such as, for example, a photoinitiator, particularly TPO (2,4,6-trimethyl-benzoyl (diphenyl)phosphine oxide), more particularly 0.5% by weight of TPO. This is because the use of a photoinitiator to initiate the polymerization can result in scintillators with a lower scintillation yield, indeed even containing fluorophores subject to photobleaching by the photon activation source; and/or
- 15% of naphthalene, 1.5% of PPO, 0.08% of POPOP, 0.5% of TPO and the remainder of TMPTA (ethoxylated trimethylolpropane triacrylate); and/or
- 10% of naphthalene, 0.1% of PPO, 0.1% of POPOP and the remainder of polystyrene; and/or
- a metal compound (namely an inorganic or organometallic compound) comprising a metal element chosen, for example, from lead, tin, bismuth or their mixtures. Such a metal element can reduce the scintillation yield; and/or
- a secondary fluorophore.

One or more of the exclusions of these compounds may also apply to the polymerization composition and/or to the ready-for-use kit according to the invention as are described below.

A nonpolar solvent suitable for a fluorescence quantum yield measurement is, for example, cyclohexane, toluene, dichloromethane, xylene or any xylene isomer.

The material for the plastic scintillation measurement according to the invention can also be denoted in the present description by the expression "plastic scintillator". It is known as "hybrid" because its fluorescence decay constant is intermediate between that of a fast plastic scintillator and of a slow plastic scintillator. Advantageously, the value of this constant can further be chosen optimally during the manufacture of the hybrid material in an intermediate range comprised between 10 ns and 90 ns (preferentially between 15 ns and 80 ns), for values between these two extremes which, to the knowledge of the inventor, are not obtained with the classic scintillators currently marketed. It can particularly be chosen between 25 ns and 75 ns, more particularly between 28 ns and 70 ns.

This tunability in time of the fluorescence decay constant of the hybrid material is rendered possible by virtue of the use of a specific fluorescent mixture. This mixture is characterized among others by the combined choice of naphthalene as main primary fluorophore and of an additional primary fluorophore having specific photophysical properties, and also by the choice of a defined concentration ratio between these two primary fluorophores.

Unexpectedly, as shown by the implementational examples, the main primary fluorophore and the additional primary fluorophore act synergistically to very substantially vary, while using a reduced concentration range for the additional primary fluorophore, the fluorescence decay constant. Further, the relative simplicity of this system, which requires essentially this combination between these two primary fluorophores, avoids the addition of an additional possibly disruptive or expensive molecule. These advantageous properties make the hybrid material of the invention a particularly effective material for the plastic scintillation measurement which can be easily produced on an industrial scale at a moderate cost.

Contrary to the improvement routes followed by the state of the art, the invention does not consist of the use of a novel polymeric matrix, the addition of additive to the plastic scintillator or the development as primary fluorophore of novel families of molecules ("quantum dots", organometallic complexes, nanoparticles, and the like) in order to overcome at least one of the abovementioned disadvantages but identifies the fluorescent mixture of the invention which makes possible access to a hybrid material. All of the characteristics necessary to the material for the plastic scintillation measurement according to the invention can thus be essentially limited to a polymeric matrix and to the incorporated fluorescent mixture. The composition of the plastic scintillator is thus simplified by being freed from the difficulty in very precisely determining the appropriate proportion between a primary fluorophore and a secondary fluorophore for the purpose of obtaining radioluminescence radiation and a fluorescence decay constant which are optimized. Thus, as indicated above, according to a specific embodiment, the hybrid material of the invention does not comprise a secondary fluorophore.

At the molecular scale, the plastic scintillator of the invention can be regarded as a pseudoliquid as the chains of the polymers constituting all or part of the polymeric matrix are labile and allow a degree of freedom of movement to the different constituents of the plastic scintillator. At the macroscopic scale, the plastic scintillator nevertheless retains sufficient mechanical strength for the purpose of manufacturing a part for scintillation detection.

The invention is completed by the following subject matters and/or characteristics, taken alone or according to any one of their technically possible combinations.

In the present description of the invention, a verb such as "to comprise", "to incorporate", "to include", "to contain" and its conjugated forms are open terms and thus do not exclude the presence of additional element(s) and/or step(s) which are added to the initial element(s) and/or step(s) stated after these terms. However, these open terms are further targeted at a specific embodiment in which only the initial element(s) and/or step(s), with the exclusion of any other, are targeted; in which case the open term further targets the closed term "to consist of", "to constitute", "to compose of" and its conjugated forms.

The use of the indefinite article "a" or "an" for an element or a step does not exclude, unless otherwise mentioned, the presence of a plurality of elements or steps, in such a way that the expression "one or more" can be substituted for it.

Any reference sign in brackets in the claims should not be interpreted as limiting the scope of the invention.

The expression "according to one or more of the alternative forms described in the present description" for a material/an element refers among others to the alternative forms which relate to the chemical composition and/or to the proportion of the constituents of this material and that any additional chemical entity which it may possibly contain and among others to the alternative forms which relate to the chemical composition, the structure, the geometry, the arrangement in space and/or the chemical composition of this element or of a constituent subelement of the element. These alternative forms are, for example, those indicated in the claims.

Furthermore, unless otherwise indicated:
  the values at the limits are included in the ranges of parameters indicated;
  except when a margin of error is indicated, the margins of uncertainty for the values mentioned are such that the maximum error for the final figure indicated has to be estimated from the convention relating to rounding up. For example, for a measurement of 3.5, the margin of error is 3.45-3.54;

the temperatures indicated are considered for an implementation at atmospheric pressure;

any percentage by weight of a component of the plastic scintillator refers to the total weight of the plastic scintillator, the remainder being constituted by the polymeric matrix.

The polymeric matrix of the hybrid material of the invention is completely or partially composed of at least one polymer comprising repeat units resulting from the polymerization of monomers or oligomers (which can themselves originate from the polymerization of monomers). The chemical structure of the repeat units is thus similar to the chemical structure of the monomers, the latter structure having only been modified by the polymerization reaction. In the present description, a polymer is a general term which can respectively denote a homopolymer or a copolymer, namely a polymer which can comprise repeat units of identical or different chemical structure.

The monomer or oligomer comprises, for example, at least one aromatic (among others, for making use of its photophysical properties), (meth)acrylic (namely acrylic or methacrylic) or vinyl group. A polymerizable group can be a group comprising an unsaturated ethylene carbon-carbon double bond, such as, for example, the (meth)acrylic or vinyl group. Further, this polymerizable group must be able to be polymerized according to a radical polymerization.

More specifically, at least one monomer can be chosen from styrene, vinyltoluene, vinylxylene, 1-vinylbiphenyl, 2-vinylbiphenyl, 1-vinylnaphthalene, 2-vinylnaphthalene, 1-methylnaphthalene, N-vinylcarbazole, methyl (meth)acrylate, (meth)acrylic acid or 2-hydroxyethyl (meth)acrylate, indeed even more generally an alkyl methacrylate, the linear or branched alkyl group of which comprises between 1 and 20 carbon atoms.

Preferably, the monomer is styrene or vinyltoluene in order to form the corresponding homopolymer.

Advantageously, the monomer can be chosen more particularly from a molecule having properties of specific fluorescence, for example 1-vinylbiphenyl, 2-vinylbiphenyl, 1-vinylnaphthalene, 2-vinylnaphthalene, 1-methylnaphthalene, N-vinylcarbazole or their mixtures.

According to a specific embodiment, the polymeric matrix of the hybrid material of the invention does not completely or partially comprise at least one polymer comprising repeat units resulting from the polymerization of monomers or oligomers comprising a triacrylate and/or trimethacrylate group; which excludes from the polymeric matrix a polymer such as, for example, TMPTA (ethoxylated trimethylolpropane triacrylate), in particular ethoxylated (15) TMPTA. Advantageously, this makes it possible to exclude a polymer having brittle mechanical properties.

The polymeric matrix can be constituted, completely or partially (preferably more than 10% by weight of polymer in the polymeric matrix), of at least one crosslinked polymer (for example by means of a crosslinking agent) in which polymeric chains are connected together by crosslinking bridges, in order, among others, to improve the mechanical and/or scintillation properties. The crosslinking agent can be a monomer comprising at least two polymerizable functionals capable, after polymerization, of forming a bridge between two polymer chains. It can be chosen from divinylbenzene, an alkyl diacrylate or an alkyl dimethacrylate, the hydrocarbon chain of these last two containing between 2 and 20 carbon atoms.

Preferably, the crosslinking agent is 1,4-butanediyl dimethacrylate or divinylbenzene.

After polymerization of the crosslinked polymer, apart from the abovementioned repeat units, the copolymer obtained can comprise repeat units resulting from the polymerization of the crosslinking agent.

As regards one of the other main constituents of the hybrid material of the invention, which is the fluorescent mixture incorporated in the polymeric matrix, the hybrid material can comprise from 1% by weight to 25% by weight of the incorporated fluorescent mixture, indeed even from 1% by weight to 5% by weight of the incorporated fluorescent mixture, with respect to the total weight of hybrid material. Above a concentration by weight of 25%, an exudation, namely a sweating of the fluorescent mixture out of the plastic scintillator, may take place.

The concentration by weight of the fluorescent mixture incorporated in the hybrid material can be easily calculated by determining the weight of the polymeric matrix.

One of the methods of a person skilled in the art is as follows: the molar concentration of the monomers and of the oligomers in the polymerization medium is known in advance or can be determined by a quantitative measurement method, such as UV spectrophotometry. The corresponding concentration by weight is subsequently calculated from the molecular weights. In point of fact, the monomers, the oligomers or their mixtures form the polymeric matrix according to a polymerization yield which can be measured beforehand but which is generally greater than 95%, indeed even 98%, indeed even generally equal to 100%. Consequently, the proportion by weight of the monomers and of the oligomers present in the polymeric matrix is equivalent to this reaction yield, multiplied by the concentration by weight determined beforehand. A person skilled in the art can thus easily, using his general knowledge, convert a concentration by weight into a molar concentration for all of the constituents of the hybrid material.

The percentages by weight or the molar percentages of the incorporated fluorescent mixture, of the main primary fluorophore, of the additional primary fluorophore, of the secondary fluorophore or of an additional compound can be determined a posteriori in the hybrid material by an analytical technique, such as, for example, solid-state Nuclear Magnetic Resonance (NMR). Another technique consists in dissolving the plastic scintillator in dichloromethane, precipitating, from methanol, the constituent polymer of the polymeric matrix, filtering the mixture obtained, in order to recover the molecule, the concentration of which it is desired to measure, then quantifying it by elemental analysis with detection of a specific constituent atom of this molecule.

The incorporate of the fluorescent mixture in the polymeric matrix can be carried out according to several embodiments. In particular, at least one fluorescent molecular chosen from the main primary fluorophore, the additional primary fluorophore or their mixtures can be incorporated in the polymeric matrix by dispersion or by grafting of this molecule in the polymeric matrix. In the case of the grafting, the fluorescent molecule (generally the additional primary fluorophore) is covalently bonded to the polymeric matrix. This covalent bond is formed, for example, during the manufacture by polymerization of the polymeric matrix, the fluorescent molecule comprising at least one polymerizable functional.

Optionally, the hybrid material of the invention can contain one or more substances not having a significant impact on the plastic scintillation measurement with the hybrid material of the invention or improving some of its properties. Just like the incorporated fluorescent mixture, these substances are generally homogeneously or nonhomogeneously dispersed in the hybrid material.

The decay constant of the hybrid material of the invention is conferred by that of the incorporated fluorescent mixture. Thus, the incorporated fluorescent mixture, and thus the hybrid material, can have a fluorescence decay constant comprised between 10 ns and 90 ns, indeed even comprised between 15 ns and 80 ns, advantageously comprised between 30 ns and 80 ns, particularly between 25 ns and 75 ns, more particularly between 28 ns and 70 ns.

Preferentially, the incorporated fluorescent mixture comprises from 90 molar % to 99.1 molar % of the main primary fluorophore (more specifically, from 90.0 molar % to 99.1 molar % of the main primary fluorophore and thus from 0.9 molar % to 10.0 molar % of the additional primary fluorophore), more preferentially still from 96 molar % to 99.1 molar % of the main primary fluorophore (more specifically from 96.0 molar % to 99.1 molar % of the main primary fluorophore and thus from 0.9 molar % to 4.0 molar % of the additional primary fluorophore): this judiciously chosen concentration of main primary fluorophore and the complementary concentration of additional primary fluorophore confer, on the incorporated fluorescent mixture and thus on the hybrid material, a fluorescence decay constant which can respectively be, at these concentration ranges, comprised between 16 ns and 74 ns, more preferentially still between 30 ns and 70 ns.

Preferably, the incorporated fluorescent mixture comprises i) from 95.6 molar % to 99.1 molar % of the main primary fluorophore consisting of naphthalene and ii) from 0.9 molar % to 4.4 molar % of the additional primary fluorophore. According to this concentration range, the fluorescence decay constant of the hybrid material of the invention can be comprised between 25 ns and 75 ns, more particularly between 28 ns and 70 ns.

These preferential concentration ranges of primary fluorophores can thus confer, on the hybrid material, an increasingly high fluorescence decay constant: such a hybrid material can then advantageously participate in the composition of a hybrid plastic scintillator compartment, optionally combined with a fast plastic scintillator compartment, in a device for detection by plastic scintillation of phoswich type, for improving the discrimination between beta particle and gamma radiation. They furthermore represent a good compromise between the scintillation yield and the tunability of the hybrid material of the invention.

For example, the variable molar concentrations of the main primary fluorophore in the incorporated fluorescent mixture (the remainder of the mixture being constituted by the additional primary fluorophore) can optionally confer, on the hybrid material, the following fluorescence decay constants:
  molar concentration of 86%: 15 ns;
  molar concentration of 95.6%: 28 ns;
  molar concentration of 96%: 35 ns;
  molar concentration of 99%: 80 ns;
  molar concentration of 100%: 90 ns.

Preferentially, the additional primary fluorophore has a fluorescence decay constant (generally denoted "tau") comprised between 1 ns and 10 ns, has a light absorption spectrum and a fluorescence emission spectrum, the centroid of which is respectively at a wavelength comprised between 250 nm and 340 nm and comprised between 330 nm and 380 nm, and the fluorescence quantum yield of which in a nonpolar solvent is comprised between 0.5 and 1.

In the present description, the centroid denotes the wavelength for the middle of the full width at half maximum of the band of greater amplitude of the radiation under consideration. A light absorption spectrum can be measured with a UV/visible spectrophotometer and a fluorescence emission spectrum can be measured with a spectrofluorometer.

The fluorescence decay constant corresponds to the variation over time of the photoluminescence intensity. It is measured by time-correlated single photon counting; as described, for example, in the document "M. Wahl, "Time-Correlated Single Photon Counting", M. Wahl, Technical instructions from PicoQuant, 2014" [reference 4], available online at the following Internet address: "https://www.picoquant.com/images/uploads/page/files/7253/te chnote tcspc.pdf", and also the work "D. V. O'Connor, D. Phillips, "Time Correlated Single Photon Counting", Academic Press, New York, 1984, pages 25 to 34" [reference 5].

The fluorescence quantum yield corresponds to the proportion of luminescence photons emitted per amount of photons absorbed by the hybrid material. Preferably, its value is obtained according to an absolute measurement method, namely not involving a third compound and a calibrating function. It is, for example, measured with an integrating sphere as module of a spectrofluorometer. For a measurement of the absolute value, reference may be made to the document "Rohwer, L. S., Martin, J. E.; "Measuring the absolute quantum efficiency of luminescent materials", J. Lumin., 2005, 115, pages 77-90" [reference 6].

The value of the fluorescence quantum yield can also be obtained according to a relative measurement method, the principle of which is as follows: knowing the absolute fluorescence quantum yield of a third compound, the value of the absolute measurement is obtained by a simple rule of three. For example, without an integrating sphere, the fluorescence quantum yield can be determined by relative measurement of the sample (a reference solution of quinine sulfate as third compound is, for example, used in the document "Velapoli, R. A.; Mielenz, K. D., "A Fluorescence Standard Reference Material: Quinine Sulfate Dihydrate", Appl. Opt., 1981, 20, 1718" [reference 7] available online at the following Internet address: https://www.nist.gov/sites/default/files/documents/srm/SP260-64.PDF).

Generally, the values obtained by the absolute and relative measurement method are identical or similar.

Advantageously, the additional primary fluorophore can have a fluorescence emission spectrum, the centroid of which is at a wavelength comprised between 355 nm and 365 nm, typically centered at approximately 360 nm, so that the interaction effect is optimum with the secondary fluorophore.

The time-correlated single photon counting is a spectroscopy technique which makes it possible to measure the fluorescence decay constant of photoluminescent compounds or their mixtures. It consists in exciting a fluorophore or a fluorescent mixture by means of a rapidly decreasing light beam (rapidly decreasing with respect to the luminescent radiation emitted in return to be observed), and in then observing, by means of a monochromator coupled to a photomultiplier, the photoluminescence outcome. The hybrid material of the invention is more particularly excited with a low frequency (typically up to 1 MHz) in order to prevent any pile-up of scintillation pulses.

Preferentially, the additional primary fluorophore is chosen from at least one compound such as:
  an oxazole (such as, for example, 2,5-diphenyloxazole (PPO)); and/or a polycyclic aromatic compound which is a hydrocarbon (namely without heteroatom) comprising from 3 to 6 phenyl rings, at least one phenyl ring of which optionally comprises at least one substituent in the ortho, meta or preferably para position (for example a linear or branched, preferably saturated, alkyl substituent R preferably comprising from 1 to 10 carbon atoms, preferentially from 1 to 4 carbon atoms), such as, for example, para-terphenyl (pTP), meta-terphenyl (mTP), para-quaterphenyl, biphenyl, 1-vinylbiphenyl, 2-vinylbiphenyl, 4-isopropylbiphenyl, para-sexiphenyl or their mixtures; and/or an oxadiazole, such as, for example, 2-phenyl-5-(4-biphenyl)-1,3,4-oxadiazole (PBD), 2-(4'-(t-butyl)phenyl)-5-(4"-biphenylyl)-1,3,4-oxadiazole (Butyl-PBD) or their mixtures; and/or a compound from the family of the anthracenes, such as anthracene, 9-anthracenyl methacrylate or their mixtures; and/or a naphthalene substituted by a vinyl group (such as 1-vinylnaphthalene or 2-vinylnaphthalene), a naphthalene substituted by an R substituent as defined above (such as, for example, 1-methylnaphthalene) or their mixtures; and/or a carbazole, such as, for example, N-vinylcarbazole, N-ethylcarbazole, N-(2-ethylhexyl)carbazole or their mixtures; and/or tetraphenylbutadiene.

More particularly, the additional primary fluorophore is 2,5-diphenyloxazole (PPO), para-terphenyl (pTP), indeed even meta-terphenyl (mTP), or their mixtures.

As indicated above, the additional primary fluorophore can be covalently bonded to the polymeric matrix, for example via the polymerization of a vinyl, allyl, acrylic or methacrylic function carried by the additional primary fluorophore. By way of example, 1-vinylbiphenyl, 2-vinylbiphenyl, 1-vinylnaphthalene, 2-vinylnaphthalene, 1-methylnaphthalene or N-vinylcarbazole can be used for the purpose of being covalently bonded in order to form a copolymer with a polymeric matrix.

The incorporated fluorescent mixture can further comprise a secondary fluorophore. The secondary fluorophore further improves the detection of the radioluminescent radiation.

The concentration by weight of the secondary fluorophore with respect to the weight of the hybrid material can be comprised between 0.002% and 0.5% by weight, preferentially between 0.01% and 0.2% by weight, more preferentially still between 0.01% and 0.1% by weight.

By way of example, the secondary fluorophore can be chosen from 1,4-di[2-(5-phenyloxazolyl)]benzene, 1,4-bis(2-methylstyryl)benzene, 1,4-bis(4-methyl-5-phenyl-2-oxazolyl)-benzene, 9,10-diphenylanthracene or their mixtures. The polymeric matrix then comprises, with respect to the weight of the hybrid material, from 0.002% by weight to 0.2% by weight of the secondary fluorophore.

According to a first embodiment, the secondary fluorophore can be chosen so that it has a light absorption spectrum and a fluorescence emission spectrum, the centroid of which is respectively at a wavelength comprised between 330 nm and 380 nm and comprised between 405 nm and 460 nm, and the fluorescence quantum yield of which in a nonpolar solvent is comprised between 0.5 and 1. The secondary fluorophore can thus be chosen from 1,4-bis(5-phenyl-2-oxazolyl)benzene (POPOP), 1,4-bis(4-methyl-5-phenyl-2-oxazolyl)benzene (dimethylPOPOP), bis-methylstyrylbenzene (bis-MSB), 9,10-diphenylanthracene (9,10-DPA) or their mixtures. The molecular structures of these secondary fluorophores are illustrated below.

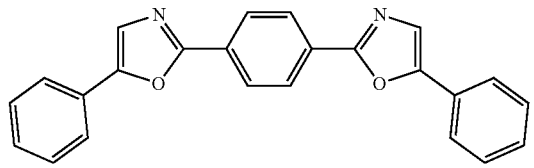

POPOP

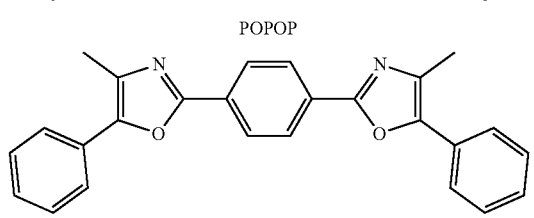

dimethylPOPOP

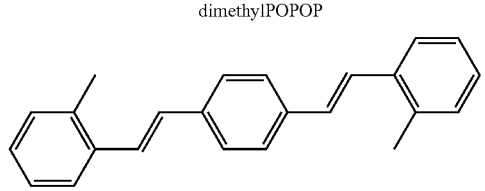

bis-MSB

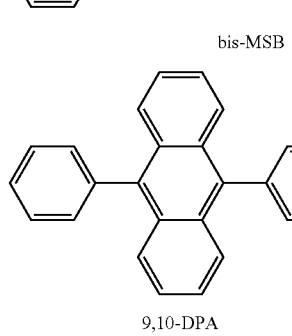

9,10-DPA

According to a second embodiment, the secondary fluorophore can be chosen so that it has a light absorption spectrum and a fluorescence emission spectrum, the centroid of which is respectively at a wavelength comprised between 330 nm and 380 nm and comprised between 460 nm and 550 nm, and the fluorescence quantum yield of which in a nonpolar solvent is comprised between 0.5 and 1. The secondary fluorophore can then be chosen from coumarin 6, coumarin 7, coumarin 30, coumarin 102, coumarin 151, coumarin 314, coumarin 334, 3-hydroxyflavone or their mixtures. The molecular structures of these secondary fluorophores are illustrated below.

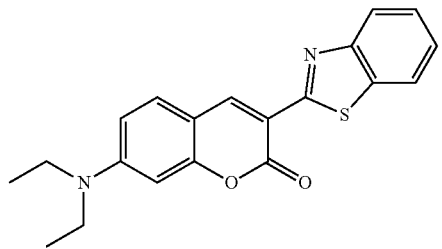

Coumarin 6

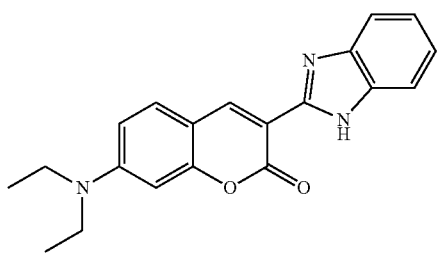

Coumarin 7

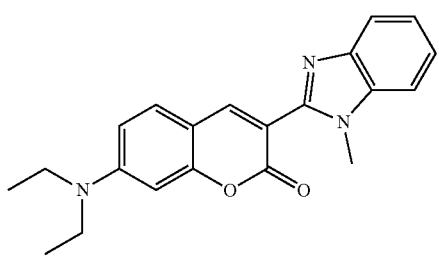

Coumarin 30
Coumarin 515

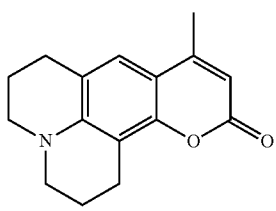

Coumarin 102
Coumarin 480

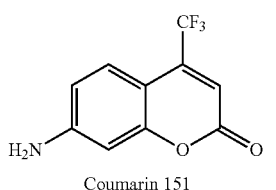

Coumarin 151

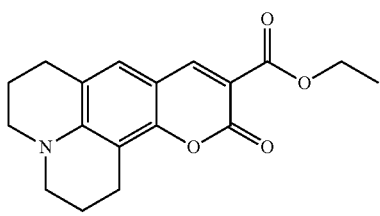

Coumarin 314
Coumarin 504

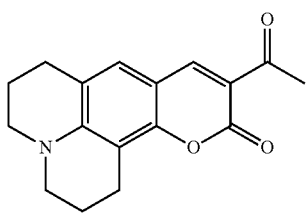

Coumarin 334

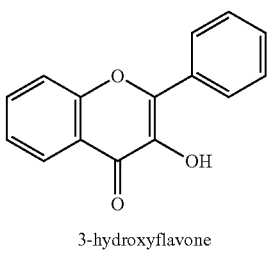 [SMILES: O=c1c(O)c(-c2ccccc2)oc2ccccc12]

3-hydroxyflavone

According to a third embodiment, the second fluorophore can be chosen so that it has a light absorption spectrum and a fluorescence emission spectrum, the centroid of which is respectively at a wavelength comprised between 330 nm and 380 nm and comprised between 550 nm and 630 nm, and the fluorescence quantum yield of which in a nonpolar solvent is comprised between 0.5 and 1. The secondary fluorophore can then be chosen from Nile red, rhodamine B or one of its salts, 4-(dicyanomethylene)-2-methyl-6-(4-dimethylaminostyryl)-4H-pyran (DCM), pyrromethene 580, any molecule of N-alkyl or N-alkyl or N-arylperylenediimide (such as, for example, N,N'-bis(2,5-di(tert-butyl)phenyl)-3,4,9,10-perylenedicarboximide). The molecular structures of these secondary fluorophores are illustrated below.

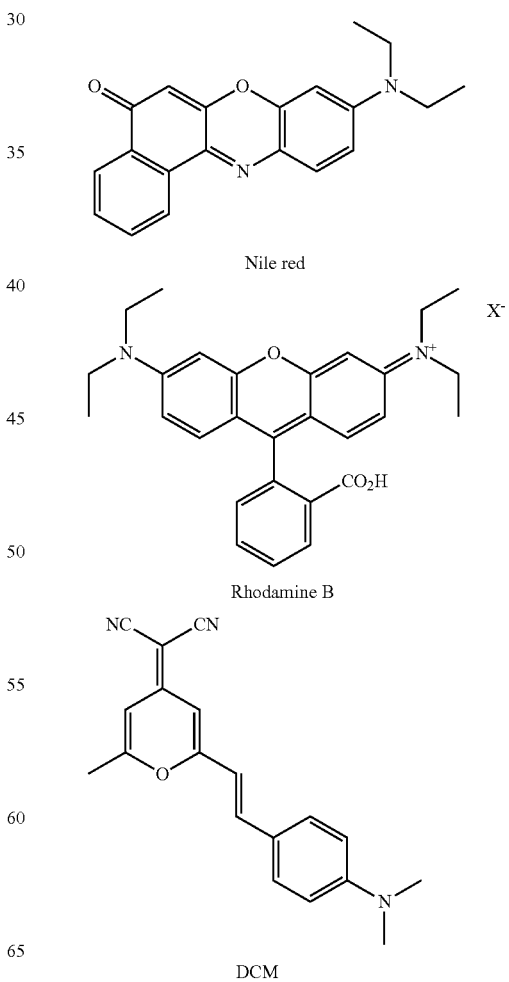

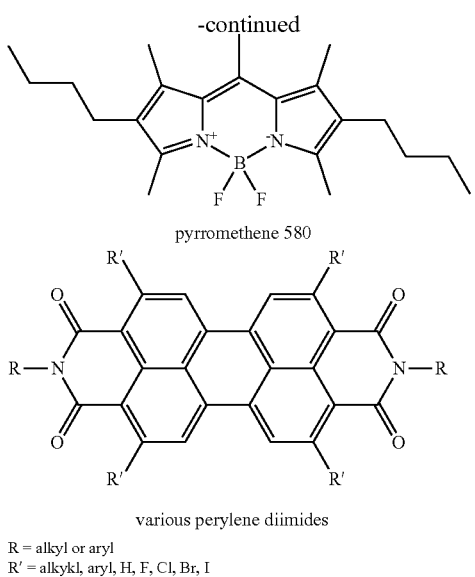

pyrromethene 580 various perylene diimides
R = alkyl or aryl
R' = alkykl, aryl, H, F, Cl, Br, I

The invention also relates to a process for the manufacture by polymerization, via a polymerization medium, of the hybrid material of the invention which can be as defined in the present description, among others according to one or more of the alternative forms described for this material.

The process for the manufacture of a hybrid material by polymerization comprises the following successive steps:
a) having available a polymerization medium comprising:
monomers, oligomers or their mixtures intended to form at least one constituent polymer of the polymeric matrix which can be as defined in the present description, among others according to one or more of the alternative forms described for this polymeric matrix;
a liquid fluorescent mixture comprising, in a molar concentration with respect to the total number of moles of primary fluorophore in the liquid fluorescent mixture, i) from 80 molar % (more specifically 80.0 molar %) to 99.6 molar % of a main primary fluorophore consisting of naphthalene and ii) from 0.4 molar % to 20 molar % (more specifically 20.0 molar %) of an additional primary fluorophore, the centroid of the light absorption spectrum and of the fluorescence emission spectrum of which have respectively a wavelength comprised between 250 nm and 340 nm and comprised between 330 nm and 380 nm, the fluorescence decay constant of which is comprised between 1 ns and 10 ns, and the fluorescence quantum yield in a nonpolar solvent of which is comprised between 0.2 and 1, preferentially comprised between 0.5 and 1;
b) polymerizing the polymerization medium in order to obtain the hybrid material.

During step b) of polymerization of a precursor of the polymer (namely a precursor such as the abovementioned monomers and/or oligomers), the main and additional primary fluorophores, as well as any other compound present in the polymerization medium, are generally trapped and distributed homogeneously in the polymeric matrix being formed.

Consequently, in the present description, the "liquid fluorescent mixture" is the fluorescent mixture comprising the main primary fluorophore and the additional primary fluorophore and which is contained in the polymerization medium before carrying out step b).

The "incorporated fluorescent mixture" denotes the fluorescent mixture comprising the main primary fluorophore and the additional primary fluorophore and which is incorporated in the hybrid material after the polymerization step b), for example by grafting or dispersion.

The "fluorescent mixture for extrusion" denotes the fluorescent mixture comprising the main primary fluorophore and the additional primary fluorophore which is contained in the extrusion mixture furthermore containing polymerized ingredients intended to form a polymeric matrix.

The polymerization medium generally does not comprise a solvent. The manufacturing process is then a "bulk polymerization" process.

Nevertheless, optionally, the polymerization medium can further comprise a polymerization solvent. The manufacturing process is then generally carried out at reflux of the solvent. The solvent of the polymerization medium can be chosen from xylene, chloroform, dichloromethane, chlorobenzene, benzene, tetrachloromethane or their mixtures.

The monomers or the oligomers can comprise at least one aromatic, (meth)acrylic or vinyl group. At least one monomer can be chosen from styrene, vinyltoluene, vinylxylene, 1-vinylbiphenyl, 2-vinylbiphenyl, 1-vinylnaphthalene, 2-vinylnaphthalene, 1-methylnaphthalene, N-vinylcarbazole, methyl (meth)acrylate, (meth)acrylic acid or 2-hydroxyethyl (meth)acrylate.

The polymerization medium can for its part comprise from 1% by weight to 25% by weight (indeed even from 1% by weight to 5% by weight) of the liquid fluorescent mixture.

The liquid fluorescent mixture can comprise from 90 molar % (more specifically 90.0 molar %) to 99.1 molar % (indeed even from 96 molar % (more specifically 96.0 molar %) to 99.1 molar %) of the main primary fluorophore; indeed even i) from 95.6 molar % to 99.1 molar % of the main primary fluorophore consisting of naphthalene and ii) from 0.9 molar % to 4.4 molar % of the additional primary fluorophore.

The polymerization medium can further comprise at least one chemical entity intended to be incorporated in the hybrid material in order to confer on it or to improve specific properties (for example a secondary fluorophore) and/or at least one entity intended to be consumed or modified during the polymerization step b) (for example a crosslinking agent, a polymerization initiator).

The polymerization medium can comprise:
a secondary fluorophore, typically according to a concentration by weight comprised between 0.002% and 0.5% by weight, indeed even from 0.002% by weight to 0.2% by weight; and/or
a crosslinking agent, typically according to a concentration by weight comprised between 0.1% and 20% (more specifically 20.0%) by weight, indeed even from 0.001% by weight to 1% by weight; and/or
a polymerization initiator, typically according to a concentration from 0.001% by weight to 1% by weight.

The additional primary fluorophore, the secondary fluorophore and/or the crosslinking agent can also be as defined according to one or more of the alternative forms described in the present description.

The polymerization reaction according to step b) can be carried out according to the conditions ordinarily employed by a person skilled in the art.

Thus, it can be started with a polymerization initiator, among others a photoinitiator, in order to initiate a radical polymerization. Preferably, the photoinitiator is not a photoinitiator which can be activated under UV radiation, such as, for example, TPO. A UV photoinitiator can produce residual compounds or modify other compounds of the plastic scintillation material, which results in a photobleaching of this material harmful to a good scintillation yield.

Preferably, in order to as much as possible avoid such a problem, the photoinitiator used in the invention can be activated under visible light radiation. For example, as indicated in the patent application WO 2013076281 [reference 8], the polymerization initiator can be chosen from a peroxide compound (for example benzoyl peroxide), a nitrile compound (for example azo(bis)isobutyronitrile (AIBN)) or their mixtures.

When the polymerization reaction is carried out, among others, with methacrylate monomers, it can be induced by heating the polymerization medium to a suitable temperature (generally comprised between 40° C. and 140° C.), or by doping the polymerization medium with 2,2-dimethoxy-2-phenylacetophenone as polymerization initiator and by then carrying out irradiation under UV (for example at a wavelength of 355 nm). The polymerization reaction in the presence of styrene monomers can be induced thermally, typically by heating between 40° C. and 140° C.

The process for the manufacture of the hybrid material by polymerization of the invention can be such that, during the polymerization step b), the polymerization medium is heated to a polymerization temperature comprised between 100° C. and 140° C. (for a period of time sufficient for the polymerization to be complete, generally for 24 hours) and then cooled according to a rate of 10° C. to 20° C. per day (generally in order to reach ambient temperature, typically 20° C.) until the hybrid material is obtained.

For example, the polymerization medium can be heated at 140° C. for 24 hours and then cooled according to a rate of 20° C. per day until it has returned to 20° C.

Steps a) and b) of the process for manufacture by polymerization via a polymerization medium of the invention can be carried out in a mold in order to obtain a part as defined in the present description or a preform of this part.

The process of manufacture of the invention by polymerization via a polymerization medium can further comprise a step c) during which the hybrid material or the preform of the part is machined in order to obtain the part as defined in the present description. This machining step consists, for example, in precision grinding the faces (for example on a lathe) and in then polishing them.

The invention also relates to a hybrid material obtained or obtainable by the process for manufacture by polymerization of a hybrid material via a polymerization medium, among others according to one or more of the alternative forms described for this process.

The invention also relates to a part for plastic scintillation detection comprising a hybrid material which can be as defined according to one or more of the alternative forms described in the present description for this material.

Generally, the part for plastic scintillation detection is thus composed, completely or partially, of a hybrid material comprising:
    a polymeric matrix; and
    a fluorescent mixture incorporated in the polymeric matrix and comprising, in a molar concentration with respect to the total number of moles of primary fluorophore in the incorporated fluorescent mixture, i) from 80 molar % (more specifically 80.0 molar %) to 99.6 molar % of a main primary fluorophore consisting of naphthalene and ii) from 0.4 molar % to 20 molar % (more specifically 20.0 molar %) of an additional primary fluorophore, the centroid of the luminous absorption spectrum and of the fluorescence emission spectrum of which respectively have a wavelength comprised between 250 nm and 340 nm and comprised between 330 nm and 380 nm (indeed even between 355 nm and 365 nm), the fluorescence decay constant of which is comprised between 1 ns and 10 ns and the fluorescence quantum yield in a nonpolar solvent of which is comprised between 0.2 and 1 (indeed even between 0.5 and 1). This part can be a unit (such as, for example, an optical fiber) or a subunit of a device for plastic scintillation detection (for example the hybrid compartment of a detector of phoswich type).

The polymeric matrix of the hybrid material composing all or a portion of the part can be composed, completely or partially, of at least one polymer comprising repeat units resulting from the polymerization of monomers comprising at least one aromatic, (meth)acrylic or vinyl group and/or it can be constituted, completely or partially, of at least one crosslinked polymer.

At least monomer intended to form the polymeric matrix is chosen from styrene, vinyltoluene, vinylxylene, 1-vinylbiphenyl, 2-vinylbiphenyl, 1-vinylnaphthalene, 2-vinylnaphthalene, 1-methylnaphthalene, N-vinylcarbazole, methyl (meth)acrylate, (meth)acrylic acid or 2-hydroxyethyl (meth)acrylate. Preferably, the monomer is styrene or vinyltoluene.

The part for plastic scintillation detection of the invention can be provided according to the following alternative forms, which are optionally combined:
    the hybrid material comprises from 1% by weight to 25% by weight (indeed even from 1% by weight to 5% by weight) of the incorporated fluorescent mixture, and/or;
    the incorporated fluorescent mixture comprises i) from 90 molar % (more specifically 90.0 molar %) to 99.1 molar % (indeed even from 96 molar % (more specifically 96.0 molar %) to 99.1 molar %) of the main primary fluorophore, indeed even comprises from 95.6 molar % to 99.1 molar % of the main primary fluorophore consisting of naphthalene, and ii) from 0.9 molar % to 4.4 molar % of the additional primary fluorophore;
    the additional primary fluorophore is covalently bonded to the polymeric matrix, and/or;
    the additional primary fluorophore is chosen from 2,5-diphenyloxazole (PPO), para-terphenyl (pTP), meta-terphenyl (mTP), biphenyl, 2-phenyl-5-(4-biphenylyl)-1,3,4-oxadiazole (PBD), 2-(4'-(t-butyl)phenyl)-5-(4"-biphenylyl)-1,3,4-oxadiazole (Butyl-PBD), anthracene, para-quaterphenyl, tetraphenylbutadiene, N-ethylcarbazole, hexyl)carbazole, 4-isopropylbiphenyl, para-sexiphenyl, 1-vinylbiphenyl, 2-vinylbiphenyl, 1-vinylnaphthalene, 2-vinylnaphthalene, 1-methylnaphthalene, N-vinylcarbazole, 9-anthracenyl methacrylate or their mixtures; the additional primary fluorophore preferably being 2,5-diphenyloxazole (PPO), para-terphenyl (pTP), indeed even meta-terphenyl (mTP), or their mixtures.

The incorporated fluorescent mixture of the hybrid material of the part can further comprise a secondary fluorophore, for example at a concentration by weight, with respect to the weight of the hybrid material, which is comprised between 0.002% and 0.5% by weight, indeed even from 0.01% by weight to 0.2% by weight, of the secondary fluorophore.

The primary fluorophore can be chosen from 1,4-di[2-(5-phenyloxazolyl)]benzene, 1,4-bis(2-methylstyryl)benzene, 1,4-bis(4-methyl-5-phenyl-2-oxazolyl)benzene, 9,10-diphenyl-anthracene or their mixtures.

According to a first embodiment, the secondary fluorophore has a light absorption spectrum and a fluorescence emission spectrum, the centroid of which is respectively at a wavelength comprised between 330 nm and 380 nm and comprised between 405 nm and 460 nm, and the fluorescence quantum yield in a nonpolar solvent of which is comprised between 0.5 and 1.

In this case, the secondary fluorophore can be chosen from 1,4-bis(5-phenyl-2-oxazolyl)benzene (POPOP), 1,4-bis(4-methyl-5-phenyl-2-oxazolyl)benzene (dimethylPOPOP), bis-methylstyrylbenzene (bis-MSB), 9,10-diphenylanthracene (9,10-DPA) or their mixtures.

According to a second embodiment, the secondary fluorophore has a light absorption spectrum and a fluorescence emission spectrum, the centroid of which is respectively at a wavelength comprised between 330 nm and 380 nm and comprised between 460 nm and 550 nm, and the fluorescence quantum yield in a nonpolar solvent of which is comprised between 0.5 and 1.

In this case, the secondary fluorophore can be chosen from coumarin 6, coumarin 7, coumarin 30, coumarin 102, coumarin 151 coumarin 314, coumarin 334, 3-hydroxyflavone or their mixtures.

According to a third embodiment, the secondary fluorophore has a light absorption spectrum and a fluorescence emission spectrum, the centroid of which is respectively at a wavelength comprised between 330 nm and 380 nm and comprised between 550 nm and 630 nm, and the fluorescence quantum yield in a nonpolar solvent of which is comprised between 0.5 and 1.

In this case, the secondary fluorophore can be chosen from Nile red, rhodamine B or one of its salts, 4-(dicyanomethylene)-2-methyl-6-(4-dimethylaminostyryl)-4H-pyran, pyrromethene 580 or an N-alkyl- or N-aryl-perylenediimide.

Because of the possibility of varying the relative proportion between the main primary fluorophore and the additional primary fluorophore, the hybrid material (and thus the part for plastic scintillation detection) can have a fluorescence decay constant comprised between 10 ns and 90 ns (indeed even between 15 ns and 80 ns); particularly between 25 ns and 75 ns, more particularly between 28 ns and 70 ns.

The part can have a great variety of shapes, for example a parallelepipedal or cylindrical shape.

The part of parallelepipedal shape is, for example, a plastic scintillator compartment capable of being incorporated in a device for plastic scintillation detection.

When the part has a cylindrical shape, and participates, for example, in the composition of a plastic scintillator pillar, it can have a square or rectangular section.

When the part of cylindrical shape is, for example, a scintillating optical fiber (in which case the hybrid material comprises a polymeric matrix constituted, completely or partially of at least one polymer which is not crosslinked), it can have a circular, elliptical or hexagonal section.

An optical fiber is a wave guide which makes use of the refractive properties of light. It is generally constituted of a core surrounded by a sheath. The core of the fiber has a slightly higher refractive index (difference of a few thousandths) than the sheath. The light is thus completely reflected multiple times at the interface between the material of the internal fiber constituting the core and the sheathing material by total internal reflection.

The scintillating optical fiber as part of the invention 10 can comprise a polymer fiber 11 composed, completely or partially, of the hybrid material and provided or not provided with a sheath 12 covering the polymer fiber and composed, completely or partially, of a sheathing material for an optical fiber, the refractive index of which is less than that of the hybrid material, the hybrid material comprising a polymeric matrix constituted, completely or partially, of at least one polymer which is not crosslinked.

Several scintillating optical fibers can be combined to give a bundle of fibers.

The presence of a sheath is not obligatory. For example, when the aim of the part is to detect an alpha particle, the scintillating optical fiber is composed solely of a polymer internal fiber devoid of a sheath in order to prevent the energy of the incident radiation from being largely absorbed by the sheath.

Nevertheless, generally, the scintillating optical fiber comprises a sheath, the sheathing material of which is a material ordinarily used for an optical fiber, in particular a scintillating optical fiber. For example, the sheathing material is chosen from poly(methyl methacrylate), poly(benzyl methacrylate), poly(trifluoromethyl methacrylate), poly(trifluoroethyl methacrylate) or their mixtures.

The invention also relates to a process for the manufacture by extrusion of a part for plastic scintillation detection and composed, completely or partially, of a hybrid material, it being possible for the part to be as defined according to one or more of the alternative forms described in the present description, the process comprising the following successive steps:

a') having available an extrusion mixture comprising:
polymerized ingredients intended to form a polymeric matrix as defined in the present description, among others according to one or more of the alternative forms described, with the exception of the case where the polymeric matrix is constituted, completely or partially (preferably more than 10% by weight of polymer in the polymeric matrix), of at least one crosslinked polymer;
a fluorescent mixture for extrusion comprising, in a molar concentration with respect to the total number of moles of primary fluorophore in the fluorescent mixture for extrusion:
i) from 80 molar % (more specifically 80.0 molar %) to 99.6 molar % (indeed even from 90 molar % (more specifically 90.0 molar %) to 99.1 molar %, indeed even from 96 molar % (more specifically 96.0 molar %) to 99.1 molar %) of a main primary fluorophore consisting of naphthalene; and
ii) from 0.4 molar % to 20 molar % (more specifically 20.0 molar %) of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns and the fluorescence quantum yield in a nonpolar solvent of which is comprised between 0.2 and 1;

b') under an extrusion atmosphere at an extrusion temperature comprised between 170° C. and 200° C., extruding the extrusion mixture through a die in order to obtain the part composed, completely or partially, of a hybrid material.

The fluorescent mixture for extrusion can also comprise i) from 95.6 molar % to 99.1 molar % of the main primary fluorophore consisting of naphthalene and ii) from 0.9 molar % to 4.4 molar % of the additional primary fluorophore.

A process for manufacture by extrusion is essentially a process for the transformation of polymerized ingredients which, once softened or in the molten state by virtue of heat, are forced continuously through a die which gives it geometry to the polymer-base profiled element obtained on conclusion of the process. The extrusion process is well known to a person skilled in the art: it is described, for example, in the document "Techniques de l'ingenieur, Extrusion extrusion monovis (partie 1), Reference AM3650, publication de 2002" [Techniques of the Engineer, Extrusion—single-screw extrusion (part 1), Reference AM3650, publication of 2002] [reference 9].

The polymerized ingredients which can be used are formed from one or more polymers which exhibit a thermal stability such that the polymer is not degraded at the temperature required for the extrusion, which depends on the glass transition temperature. Their chemical composition is identical to that of the polymeric matrix.

The polymerized ingredients are generally in the solid form, in particular in the form of granules.

The extrusion step b') can be carried out by means of an extruder (for example an extruder of single-screw, twin-screw or multiscrew type) or of a cokneader. Typically, the die is positioned at the outlet of the extruder.

The extrusion atmosphere can be chemically inert with regard to the extrusion mixture. Such an atmosphere limits or prevents the oxidation of the polymeric matrix obtained. It comprises, for example, nitrogen or a rare gas, such as, for example, argon.

Typically, the extrusion process of the invention is carried out at an extrusion temperature of less than 218° C., which is the evaporation temperature of naphthalene at atmospheric pressure, but at a temperature sufficiently high to soften or melt the polymerized ingredients, for example at an extrusion temperature comprised between 170° C. and 200° C.

The invention also relates to a process for the manufacture by polymerization of a part for plastic scintillation detection and composed, completely or partially, of a hybrid material, it being possible for the part to be as defined according to one or more of the alternative forms described in the present description, the process comprising at least one polymerization via a polymerization medium according to the following successive steps:

a) in a first mold, having available a first polymerization medium comprising:

monomers, oligomers or their mixtures intended to form at least one constituent polymer of a polymeric matrix as defined according to one or more of the alternative forms described in the present description (among others, the case where the polymeric matrix is constituted, completely or partially, of at least one cross-linked polymer);

a liquid fluorescent mixture comprising, in a molar concentration with respect to the total number of moles of primary fluorophore in the liquid fluorescent mixture:

i) from 80 molar % (more specifically 80.0 molar %) to 99.6 molar % of a main primary fluorophore consisting of naphthalene; and ii) from 0.4 molar % to 20 molar % (more specifically 20.0 molar %) of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns, and the fluorescence quantum yield in a nonpolar solvent of which is comprised between 0.2 and 1;

b) polymerizing the first polymerization medium in order to directly obtain the part or a preform of the part which is subsequently modified (for example machined, among others by drawing the preform) in order to obtain the part.

In the process for the manufacture of a part by polymerization, the fluorescent mixture is liquid as it is mixed in the first polymerization medium with monomers and/or oligomers.

The internal volume of the mold can have a parallelepipedal or cylindrical shape. The cylindrical shape can be of circular, elliptical, hexagonal, square or rectangular section.

When the internal volume of the mold has a parallelepipedal shape, the process for manufacture by polymerization can so that the part of parallelepipedal shape obtained on conclusion of step b) is a plastic scintillator compartment as defined in the present description and capable of being incorporated in a device for plastic scintillation detection.

In this case, the plastic scintillator compartment of parallelepipedal shape can be obtained directly on conclusion of the process for manufacture by polymerization, after, if appropriate, an optional precision grinding step.

When the internal volume of the mold has a cylindrical shape, the process for manufacture by polymerization can be such that the part is a scintillating optical fiber 10 devoid of the sheath which can be as defined in the present description according to one or more of its alternative forms, so that a cylindrical bar as preform of the part is obtained on conclusion of step b), the process comprising the following additional step carried out after the polymerization step b):

c) in a fiber-drawing tower, softening by heating and then drawing the preform of the part in order to obtain a polymer fiber 11 composed, completely or partially, of the hybrid material as scintillating optical fiber 10 devoid of a sheath.

Alternatively, when the internal volume of the mold has a cylindrical shape, the process for manufacture by polymerization can be such that the part is a scintillating optical fiber 10 provided with a sheath 12 which can be as defined in the present description according to one or more of the alternative forms, so that a cylindrical bar as first preform of the part is obtained on conclusion of step b), the process comprising the following additional step carried out after step b):

b1) placing the first preform of the part in a second cylindrical mold and then filling the free volume delimited by the internal face of the second cylindrical mold and the external face of the first preform of the part with a second polymerization medium comprising a precursor of a sheathing material for optical fiber for which the refractive index of the sheathing material is less than that of the hybrid material;

b2) polymerizing the second polymerization medium in order to form the sheathing material which covers the first preform of the part, in order to obtain a second preform of the part (constituting a parison);

c) in a fiber-drawing tower, softening by heating and then drawing the second preform of the part in order to obtain, as scintillating optical fiber 10 provided with a sheath 12, a polymer fiber 11 composed, completely or partially, of the hybrid material and provided with the sheath 12 covering the polymer fiber 11.

In these two alternatives, the internal volume of the cylindrical mold has, for example, a circular section. The mold can then have an internal diameter comprised between 2 cm and 10 cm (typically 5 cm) and/or a longitudinal length comprised between 10 cm and 100 cm (typically 50 cm). These dimensions correspond generally to those of the cylindrical bar as parison or preform of the part.

The precursor of the sheathing material is, for example, chosen from methyl methacrylate, benzyl methacrylate, trifluoromethyl methacrylate, trifluoroethyl methacrylate or their mixtures.

The preform of the part or parison is generally placed vertically over the fiber-drawing tower. On conclusion of step c), the scintillating optical fiber, provided or not provided with a sheath, is generally recovered by gravimetric tower fiber drawing.

During the polymerization step b) and/or b1), the first polymerization medium can be heated to a first polymerization temperature comprised between 100° C. and 140° C. (for example for a period of time of 12 h to 24 h, among others one day at 140° C.) and then cooled according to a fall in the polymerization temperature of 10° C. to 20° C. per day until the part or the preform of the part is obtained. The cooling is generally continued until the ambient temperature of 20° C. is reached.

During the polymerization step b2), the second polymerization medium can be heated to a second polymerization temperature comprised between 50° C. and 70° C. (for example for a period of time of 8 to 10 days, among others 10 days at 60° C.) and then cooled according to a fall in the polymerization temperature of 10° C. to 20° C. per day until the part or the preform of the part is obtained. The cooling is generally continued until the ambient temperature of 25° C. is reached.

The heating operation in order to soften can for its part be carried out during step c) at a temperature comprised between 150° C. and 190° C.

The preform of the part can be precision ground immediately before carrying out the drawing step c). For example, the cylindrical bar is precision ground by cutting its upper and lower part over a short length. The upper face of a part of parallelepipedal shape, namely the face which ends up in light contact with the ambient air, can also be precision ground by cutting the upper part over a short length and then polishing.

On conclusion of the process for manufacture of polymerization, the scintillating optical fiber can be such that:
  the diameter of the polymer fiber 11 is comprised between 50 µm and 1 mm, and/or;
  the thickness of the sheath 12 is comprised between 1 µm and 20 µm, and/or;
  the length of the scintillating optical fiber is comprised between 0.1 and 2 km.

The first polymerization medium and/or the second polymerization medium can comprise a polymerization solvent chosen, for example, from xylene, chloroform, dichloro-methane, chlorobenzene, benzene, tetrachloromethane or their mixtures.

Regarding respectively the process for the manufacture of a part by extrusion or the process for the manufacture of a part by polymerization, the fluorescent mixture for extrusion or the liquid fluorescent mixture can be such that:
  it comprises from 90 molar % (more specifically 90.0 molar %) to 99.1 molar % (indeed even from 96 molar % (more specifically 96.0 molar %) to 99.1 molar %) of the main primary fluorophore, and/or; indeed even i) from 95.6 molar % to 99.1 molar % of the main primary fluorophore consisting of naphthalene and thus ii) from 0.9 molar % to 4.4 molar % of the additional primary fluorophore;
  the additional primary fluorophore has a fluorescence quantum yield in a nonpolar solvent comprised between 0.5 and 1, and/or;
  it comprises a secondary fluorophore as defined in the present description, among others according to one or more of the alternative forms described.

The invention also relates to a device for plastic scintillation detection comprising a part for plastic scintillation detection (which can be as defined according to one or more of the alternative forms described in the present description) as hybrid plastic scintillator element, the part generally being composed, completely or partially, of a hybrid material comprising:
  a polymeric matrix; and
  a fluorescent mixture incorporated in the polymeric matrix and comprising, in a molar concentration with respect to the total number of moles of primary fluorophore in the incorporated fluorescent mixture:
  i) from 80 molar % (more specifically 80.0 molar %) to 99.6 molar % of a main primary fluorophore consisting of naphthalene; and
  ii) from 0.4 molar % to 20 molar % (more specifically 20.0 molar %) of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns and the fluorescence quantum yield in a nonpolar solvent of which is comprised between 0.2 and 1 (indeed even between 0.5 and 1); the part being coupled to an electronic acquisition module so that the module is capable of collecting the radioluminescent radiation emitted by the part when the latter is brought into contact with an ionizing radiation or an ionizing particle.

The polymeric matrix of the hybrid material composing all or a portion of the part can be composed, completely or partially, of at least one polymer comprising repeat units resulting from the polymerization of monomers comprising at least one aromatic, (meth)acrylic or vinyl group and/or it can be constituted, completely or partially, of at least one crosslinked polymer.

At least one monomer intended to form the polymeric matrix can be chosen from styrene, vinyltoluene, vinylxylene, 1-vinylbiphenyl, 2-vinylbiphenyl, 1-vinylnaphthalene, 2-vinylnaphthalene, 1-methylnaphthalene, N-vinylcarbazole, methyl (meth)acrylate, (meth)acrylic acid or 2-hydroxyethyl (meth)acrylate. Preferably, the monomer is styrene or vinyltoluene.

The hybrid material composing all or a portion of the part integrated in the device for plastic scintillation detection of the invention can be provided according to the following alternative forms, which are optionally combined:
  the hybrid material comprises from 1% by weight to 25% by weight (indeed even from 1% by weight to 5% by weight) of the incorporated fluorescent mixture, and/or;
  the incorporated fluorescent mixture comprises from 90 molar % (more specifically 90.0 molar %) to 99.1 molar % (indeed even from 96 molar % (more specifically 96.0 molar %) to 99.1 molar %) of the main primary fluorophore; indeed even i) from 95.6 molar % to 99.1 molar % of the main primary fluorophore consisting of naphthalene and ii) from 0.9 molar % to 4.4 molar % of the additional primary fluorophore, and/or;
  the additional primary fluorophore is covalently bonded to the polymeric matrix, and/or;
  the additional primary fluorophore is chosen from 2,5-diphenyloxazole (PPO), para-terphenyl (pTP), meta-terphenyl (mTP), biphenyl, 2-phenyl-5-(4-biphenylyl)-1,3,4-oxadiazole (PBD), 2-(4'-(t-butyl)phenyl)-5-(4"-biphenylyl)-1,3,4-oxadiazole (Butyl-PBD), anthracene, para-quaterphenyl, tetraphenylbutadiene, N-ethylcarbazole, hexyl)carbazole, 4-isopropylbiphenyl, para-sexiphenyl, 1-vinylbiphenyl, 2-vinylbiphenyl, 1-vinylnaphthalene, 2-vinylnaphthalene, 1-methylnaphthalene, N-vinylcarbazole, 9-anthracenyl methacrylate or their mixtures; the additional primary fluorophore preferably being 2,5-diphenyloxazole (PPO), para-terphenyl (pTP), indeed even meta-terphenyl (mTP), or their mixtures.

The incorporated fluorescent mixture of the hybrid material of the part can further comprise a secondary fluorophore, for example at a concentration by weight with respect to the weight of the hybrid material which is comprised between 0.002% and 0.5% by weight, indeed even from 0.01% by weight to 0.2% by weight, of the secondary fluorophore.

The primary fluorophore can be chosen from 1,4-di[2-(5-phenyloxazolyl)]benzene, 1,4-bis(2-methylstyryl)benzene, 1,4-bis(4-methyl-5-phenyl-2-oxazolyl)benzene, 9,10-diphenyl-anthracene or their mixtures.

According to a first embodiment, the secondary fluorophore has a light absorption spectrum and a fluorescence emission spectrum, the centroid of which is respectively at a wavelength comprised between 330 nm and 380 nm and comprised between 405 nm and 460 nm, and the fluorescence quantum yield in a nonpolar solvent of which is comprised between 0.5 and 1.

In this case, the secondary fluorophore can be chosen from 1,4-bis(5-phenyl-2-oxazolyl)benzene (POPOP), 1,4-bis(4-methyl-5-phenyl-2-oxazolyl)benzene (dimethylPO-POP), bis-methylstyrylbenzene (bis-MSB), 9,10-diphenylanthracene (9,10-DPA) or their mixtures.

According to a second embodiment, the secondary fluorophore has a light absorption spectrum and a fluorescence emission spectrum, the centroid of which is respectively at a wavelength comprised between 330 nm and 380 nm and comprised between 460 nm and 550 nm, and the fluorescence quantum yield in a nonpolar solvent of which is comprised between 0.5 and 1.

In this case, the secondary fluorophore can be chosen from coumarin 6, coumarin 7, coumarin 30, coumarin 102, coumarin 151 coumarin 314, coumarin 334, 3-hydroxyflavone or their mixtures.

According to a third embodiment, the secondary fluorophore has a light absorption spectrum and a fluorescence emission spectrum, the centroid of which is respective at a wavelength comprised between 330 nm and 380 nm and comprised between 550 nm and 630 nm, and the fluorescence quantum yield in a nonpolar solvent of which is comprised between 0.5 and 1.

In this case, the secondary fluorophore can be chosen from Nile red, rhodamine B or one of its salts, 4-(dicyanomethylene)-2-methyl-6-(4-dimethylaminostyryl)-4H-pyran, pyrromethene 580 or an N-alkyl- or N-aryl-perylenediimide.

Because of the possibility of varying the relative proportion between the main primary fluorophore and the additional primary fluorophore, the hybrid material (and thus the part for plastic scintillation detection and the device which integrates it) can have a fluorescence decay constant comprised between 10 ns and 90 ns (indeed even between 15 ns and 80 ns); particularly between 25 ns and 75 ns, more particularly between 28 ns and 70 ns.

The part of the device can have a great variety of shapes, for example a parallelepipedal or cylindrical shape.

The part of parallelepipedal shape is, for example, a plastic scintillator compartment capable of being incorporated in a device for plastic scintillation detection.

When the part has a cylindrical shape, and participates, for example, in the composition of a plastic scintillator pillar, it can have a square or rectangular section.

When the part of cylindrical shape is, for example, a scintillating optical fiber (in which case the hybrid material comprises a polymeric matrix constituted, completely or partially of at least one polymer which is not crosslinked), it can have a circular, elliptical or hexagonal section.

The scintillating optical fiber as part of the invention 10 can comprise a polymer fiber 11 composed, completely or partially, of the hybrid material and provided or not provided with a sheath 12 covering the polymer fiber and composed, completely or partially, of a sheathing material for an optical fiber, the refractive index of which is less than that of the hybrid material, the hybrid material comprising a polymeric matrix constituted, completely or partially, of at least one polymer which is not crosslinked.

Several scintillating optical fibers can be combined to give a bundle of fibers.

The presence of a sheath is not obligatory. For example, when the aim of the part is to detect an alpha particle, the scintillating optical fiber is composed solely of a polymer internal fiber devoid of a sheath in order to prevent the energy of the incident radiation from being largely absorbed by the sheath.

Nevertheless, generally, the scintillating optical fiber comprises a sheath, the sheathing material of which is a material ordinarily used for an optical fiber, in particular a scintillating optical fiber. For example, the sheathing material is chosen from poly(methyl methacrylate), poly(benzyl methacrylate), poly(trifluoromethyl methacrylate), poly(trifluoroethyl methacrylate) or their mixtures.

The coupling between the part as plastic scintillator element and the acquisition module is generally carried out by bringing the acquisition module into contact with a portion of the part from which the radioluminescent radiation emerges from the part.

According to a first embodiment, the device for plastic scintillation detection is such that the hybrid plastic scintillator element is a first hybrid plastic scintillator element 1, the device further comprising a second fast plastic scintillator element 2, the fluorescence decay constant of which is less than that of the first hybrid plastic scintillator element 1, these plastic scintillator elements 1 and 2 forming a plastic scintillator assembly. The first hybrid plastic scintillator element 1 is preferably composed, completely or partially, of a hybrid material, the fluorescence decay constant of which is comprised within one of the abovementioned ranges for the hybrid material (for example between 10 ns and 90 ns, indeed even comprised between 15 ns and 80 ns, advantageously comprised between 30 ns and 80 ns, particularly between 70 ns and 80 ns; or between 25 ns and 75 ns, indeed even between 28 ns and 70 ns, when the molar concentration of the main primary fluorophore consisting of naphthalene is comprised between 95.6% and 99.1%). The device is preferentially a device of phoswich type, in which, for example, each plastic scintillator element is a plastic scintillator compartment.

However, the invention described is not limited to the incorporation of the hybrid material in a plastic scintillator detector of phoswich type. It is advantageous so long as a person skilled in the art needs a plastic scintillator with a predetermined and optimized fluorescence decay constant.

The first hybrid plastic scintillator element 1 can be in direct contact with the second fast plastic scintillator element 2.

According to another alternative, the first hybrid plastic scintillator element 1 is in contact with the second fast plastic scintillator element 2 via a bonding layer 5. The plastic scintillator assembly thus further comprises a bonding layer.

In the case where the plastic scintillator elements are of parallelepipedal shape, the first hybrid plastic scintillator element and the second fast plastic scintillator element are typically in contact with one another via one of their faces, preferably their face of greatest surface area or of identical surface area.

In the case where the plastic scintillator elements are of cylindrical shape, the first hybrid plastic scintillator element and the second fast plastic scintillator element are typically in contact with one another via their circular faces, which generally have identical surface areas at the points of their contact.

Taking as reference the direction R of propagation of the ionizing radiation or of the ionizing particle with regard to the device for plastic scintillation detection, the first hybrid plastic scintillator element can be without distinction the upstream plastic scintillator element or the downstream plastic scintillator element, in which case the second fast plastic scintillator element is respectively the downstream or upstream plastic scintillator element.

With reference to the direction of propagation of the ionizing radiation or of the ionizing particle with regard to the device, the first hybrid plastic scintillator element 1 is preferably the upstream plastic scintillator element and the second fast plastic scintillator element 2 is the downstream plastic scintillator element.

The plastic scintillator elements 1 and 2 can have different thicknesses, so that the device comprises a thin plastic scintillator element and a thick plastic scintillator element. Both configurations are thus possible: the first hybrid plastic scintillator element can be the thin plastic scintillator element or the thick plastic scintillator element.

Preferably, the thickness of the first hybrid plastic scintillator element is less than that of the second fast plastic scintillator element. Thus, according to a preferential embodiment of the invention for the purpose of promoting beta/gamma discrimination, the device can comprise a thin first hybrid plastic scintillator element 1 and a thick second fast plastic scintillator element 2. Preferably, the device then comprises the first thin hybrid plastic scintillator element 1 upstream and the second thick fast plastic scintillator element 2 downstream, with reference to the direction R of propagation of the ionizing radiation or of the ionizing particle with regard to the device.

The thin plastic scintillator element can have a thickness from 10 µm to 1 mm, for example from 50 µm to 1 mm, preferably from 100 µm to 500 µm; and the thick plastic scintillator element can have a thickness ranging from 1 mm to several centimeters, for example from 1 mm to 10 cm, preferably from 3 mm to 5 cm.

The second fast plastic scintillator element 2 can have a fluorescence decay constant comprised between 1 ns and 7 ns.

The second fast plastic scintillator element 2 can comprise a polymeric matrix which can be as defined in the present description, among others according to one or more of the alternative forms described for this polymeric matrix, and/or a fast primary fluorophore chosen from 2,5-diphenyloxazole (PPO), para-terphenyl (pTP), meta-terphenyl (mTP), biphenyl, 2-phenyl-5-(4-biphenylyl)-1,3,4-oxadiazole (PBD), 2-(4'-(t-butyl)phenyl)-5-(4"-biphenylyl)-1,3,4-oxadiazole (butyl-PBD), anthracene or their mixtures. Preferably, the fast primary fluorophore is 2,5-diphenyl-oxazole (PPO), para-terphenyl (pTP), indeed even meta-terphenyl (mTP), or their mixtures.

The second fast plastic scintillator element 2 can comprise a secondary fluorophore which can be as defined in the present description, among others according to one or more of the alternative forms described.

According to a second embodiment, the device for plastic scintillation detection according to the invention can comprise a single hybrid plastic scintillator element ("single-compartment" plastic scintillation device). Such a single-compartment device is advantageous when it is coupled to an electronic acquisition module, the sampling frequency of which is less than 250 MHz: in accordance with the Niquist-Shannon theorem, a long pulse, such as obtained with a single hybrid plastic scintillator, is better described with such an acquisition module for which the electronics are limited in number of points per nanosecond.

Generally, whatever the embodiment, the part can be coupled to the electronic acquisition module by an optical interface layer 6, namely by optical coupling.

The optical interface layer has, among others, the property of allowing the passage of the radiation exiting from the plastic scintillator element, in particular in the downstream position. This layer can be composed, completely or partially, of a material known to a person skilled in the art, for example chosen from greases, adhesives, gels, cements, elastomeric compounds, silicone compounds or their mixtures.

The coupling between the part and the electronic acquisition module can be carried out directly or indirectly via the hybrid plastic scintillator element.

For example, this coupling is generally direct for the single hybrid plastic scintillator element.

The coupling with the hybrid plastic scintillator element is, on the other hand, indirect in the case of the phoswich scintillator: the downstream fast plastic scintillator element will be interposed between these two parts, and it is the only one to be in direct contact with the electronic acquisition module.

As regards the electronic acquisition module, it can comprise a photodetector 3, for example chosen from a photomultiplier, a photodiode, a charge-coupled device CCD camera or a CMOS sensor.

The electronic acquisition module can be placed downstream, with reference to the direction of propagation of the ionizing radiation or of the ionizing particle with regard to the device, of the part as hybrid plastic scintillator element, of the single hybrid plastic scintillator element, of the first hybrid plastic scintillator element 1 or of the second fast plastic scintillator element 2.

It can be calibrated in energy by virtue of standard scintillating substances.

The invention also relates to an item of equipment for plastic scintillation detection comprising a device as defined in the present description according to one or more of its alternative forms, constituted by a portable instrument for the detection of ionizing radiation, a walk-through scanner or a CCD ("Charge-Coupled Device") detector.

The invention also relates to a process for the manufacture of a device for plastic scintillation detection as defined in the present description according to one or more of its alternative forms, in which the part as hybrid plastic scintillator element is coupled (directly or indirectly) to the electronic acquisition module, so that the module is capable of collecting the radioluminescent radiation emitted by the part when the latter is brought into contact with an ionizing radiation or an ionizing particle.

The manufacturing process can be such that the device comprises a plastic scintillator assembly, the process comprising the following successive steps:

a") having available a first hybrid plastic scintillator element 1 as part and having available a second fast plastic scintillator element 2, the fluorescence decay constant of which is less than that of the first hybrid plastic scintillator element 1; each of these plastic scintillator elements further having a polished surface of the same dimension as that of the other plastic scintillator element;

b") coupling, via their polished surface, the first hybrid plastic scintillator element 1 and the second fast plastic scintillator element 2, in order to obtain the plastic scintillator assembly;

c") coupling the plastic scintillator assembly, comprising the part, to the electronic acquisition module, so that the module is capable of collecting the radioluminescent radiation emitted by the plastic scintillator assembly when the latter is brought into contact with an ionizing radiation or an ionizing particle.

According to a first embodiment, the process for the manufacture of the device is a process of autogenous coupling by thermal bonding: step b") of bonding by coupling can be carried out by heating the polished surface of the first hybrid plastic scintillator element 1 and of the second fast plastic scintillator element 2 in order to soften these surfaces, which are subsequently pressed against one another in order to couple them.

According to a second embodiment, the process for the manufacture of the device comprising a plastic scintillator assembly is a molecular autogenous coupling process (namely autogenous in situ), the process comprising the following successive steps:

a''') a plastic scintillator element, constituted by a first hybrid plastic scintillator element 1 as part of or by a second fast plastic scintillator element 2, the fluorescence decay constant of which is less than that of the first hybrid plastic scintillator element 1, is manufactured in situ by polymerization on the other plastic scintillator element, which constitutes a polymerization support, in order to obtain a plastic scintillator assembly on conclusion of step a''');

b''') the plastic scintillator assembly comprising the part is coupled to the electronic acquisition module, so that the module is capable of collecting the radioluminescent radiation emitted by the plastic scintillator assembly when the latter is brought into contact with an ionizing radiation or an ionizing particle.

The coupling between the plastic scintillator elements 1 and 2 according to step b"), and/or the coupling according to which the electronic acquisition module is coupled with the plastic scintillator assembly according to step c") or step b''') or with the single hybrid plastic scintillator element as defined in the present description according to one or more of its alternative forms, can be carried out by means of an optical interface layer 6.

The optical interface layer 6 can be an optical cement (for example of EJ-500 type), a "coupling" solvent (generally an alcohol, such as, for example, isopropanol or 1-butanol) or, preferably, an optical grease (for example of RTV141A type).

This interface layer generally has a thickness from 1 μm to 10 μm.

The invention also relates to a plastic scintillation measurement method, the method comprising the following successive steps:

i) a device for plastic scintillation detection as defined in the present description, among others according to one or more of its alternative forms, is brought into contact with an ionizing radiation or an ionizing particle in order for the part (by virtue of the hybrid material which it contains) comprised in the device to emit radioluminescent radiation; and ii) the radioluminescent radiation is measured with the electronic acquisition module of the device.

Preferentially, the duration of the decay in the radioluminescent radiation measured is comprised between 10 ns and 90 ns, more preferentially still between 15 ns and 80 ns, more preferentially still between 30 ns and 80 ns, particularly between 25 ns and 75 ns, more particularly between 28 ns and 70 ns.

The ionizing radiation or the ionizing particle can originate from a radioactive substance which emits gamma rays, X-rays, beta particles, alpha particles or neutrons. If appropriate, the radioactive substance can emit several types of ionizing radiation or of ionizing particles. Thus, advantageously, the gamma rays and the beta particles can be distinguished by virtue of the shape of the different pulses during the measurement step b) with the scintillation measurement method of the invention.

The radioluminescent radiation which results from this exposure can be measured according to step ii) with a photodetector, such as, for example, a photodetector chosen from a photomultiplier, a photodiode, a charge-coupled device (CCD) camera, a CMOS ("Complementary Metal-Oxide Semiconductor") sensor or any other photon detector, of which the capture is converted into an electrical signal.

According to a preferential embodiment of the invention, the measurement method can comprise a step iii) in which the presence and/or the amount of the radioactive substance is determined from the measurement of the radio-luminescent radiation according to step ii), as is ordinarily carried out in plastic scintillation. By way of example, the qualitative and/or quantitative measurement step iii) is described by making the analogy with the plastic scintillation from the document "*Techniques de l'ingénieur, Mesures de radioactivité par scintillation liquide*, Reference p2552, publication du Oct. 3, 2004" [Techniques of the Engineer, Measurements of radioactivity by liquid scintillation, Reference p2552, publication of Oct. 3, 2004] [reference 10].

The quantitative determination can among others measure the activity of the radioactive source. It can be carried out from a calibration curve.

This curve is, for example, such that the number of photons originating from the radioluminescent radiation emitted for a known radioactive substance is correlated with the energy of the incident radiation for this radioactive substance. It is then possible, from the solid angle, from the distance between the radioactive source and the plastic scintillator, and from the activity detected by the measurement method using the plastic scintillator of the invention, to quantify the activity of the radioactive source.

The invention also relates to a polymerization composition for manufacturing a hybrid material (as defined in the present description, according to one or more of its alternative forms) for plastic scintillation detection comprising:

monomers, oligomers or their mixtures intended to form at least one constituent polymer of a polymeric matrix as defined in the present description according to one or more of the alternative forms;

a liquid fluorescent mixture comprising, in a molar concentration with respect to the total number of moles of primary fluorophore in the liquid fluorescent mixture;

i) from 80 molar % (more specifically 80.0 molar %) to 99.6 molar % (indeed even from 90 molar % (more specifically 90.0 molar %) to 99.1 molar %, indeed even from 96 molar % (more specifically 96.0 molar %) to 99.1 molar %) of a main primary fluorophore consisting of naphthalene; and ii) from 0.4 molar % to 20 molar % (more specifically 20.0 molar %) of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns and the fluorescence quantum yield in a nonpolar solvent of which is comprised between 0.2 and 1 (indeed even between 0.5 and 1).

According to a specific embodiment of the polymerization composition according to the invention, the liquid fluorescent mixture can comprise i) from 95.6 molar % to 99.1 molar % of the main primary fluorophore consisting of naphthalene and ii) from 0.9 molar % to 4.4 molar % of the additional primary fluorophore.

The monomers, the oligomers and their mixtures can comprise at least one aromatic, (meth)acrylic or vinyl group.

The liquid fluorescent mixture can comprise a secondary fluorophore, as defined in the present description, according to one or more of its alternative forms.

Thus, according to some of these alternative forms, the secondary fluorophore can have:
  a light absorption spectrum and a fluorescence emission spectrum, the centroid of which is respectively at a wavelength comprised between 330 nm and 380 nm and comprised between 405 nm and 460 nm, and the fluorescence quantum yield in a nonpolar solvent of which is comprised between 0.5 and 1, or;
  a light absorption spectrum and a fluorescence emission spectrum, the centroid of which is respectively at a wavelength comprised between 330 nm and 380 nm and comprised between 460 nm and 550 nm, and the fluorescence quantum yield in a nonpolar solvent of which is comprised between 0.5 and 1, or;
  a light absorption spectrum and a fluorescence emission spectrum, the centroid of which is respectively at a wavelength comprised between 330 nm and 380 nm and comprised between 550 nm and 630 nm, and the fluorescence quantum yield in a nonpolar solvent of which is comprised between 0.5 and 1.

The secondary fluorophore can be at a concentration by weight, with respect to the weight of the polymerization composition, which is comprised between 0.002% and 0.5% by weight.

The polymerization composition can comprise from 1% by weight to 25% by weight of the liquid fluorescent mixture.

It can also further comprise a polymerization solvent.

The polymerization composition can be employed in the processes for the manufacture of the hybrid material or of the part as were described above.

The invention also relates to a ready-for-use kit with mixed fluorophores for the manufacture of a polymerization composition (as defined in the present description, according to one or more of its alternative forms) comprising, separately for the purpose of the assembling thereof, the following components of the kit:
  i) monomers, oligomers or their mixtures intended to form at least one constituent polymer of a polymeric matrix and;

ii) a fluorescent mixture for a polymerization kit comprising, as a molar concentration with respect to the total number of moles of primary fluorophore in the fluorescent mixture for a polymerization kit:
  i) from 80 molar % (more specifically 80.0 molar %) to 99.6 molar % of a main primary fluorophore consisting of naphthalene; and
  ii) from 0.4 molar % to 20 molar % (more specifically 20.0 molar %) of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns and the fluorescence quantum yield in a nonpolar solvent of which is comprised between 0.2 and 1 (indeed even between 0.5 and 1).

As regards the composition and the proportion of its components, the fluorescent mixture for a polymerization kit is identical to the liquid fluorescent mixture described above. However, when it does not comprise a solvent, it differs from the liquid fluorescent mixture solely in the fact that it is then in the solid form and not the liquid form.

The ready-for-use kit with mixed fluorophores can comprise:
  a first compartment I) containing the monomers, the oligomers or their mixtures;
  a second compartment II) containing the fluorescent mixture for a polymerization kit.

The fluorescent mixture for a polymerization kit can contain from 90 molar % (more specifically 90.0 molar %) to 99.1 molar % (indeed even from 96 molar % (more specifically 96.0 molar %) to 99.1 molar %) of the main primary fluorophore. It can represent from 1% by weight to 25% by weight of the components of the kit.

According to a specific embodiment of the invention, the fluorescent mixture for a polymerization kit can comprise i) from 95.6 molar % to 99.1 molar % of the main primary fluorophore consisting of naphthalene and ii) from 0.9 molar % to 4.4 molar % of the additional primary fluorophore.

The ready-for-use kit with mixed fluorophores can be such that a secondary fluorophore as defined in the present description according to one or more of its alternative forms, a polymerization solvent or their mixture is mixed with the i) monomers, oligomers or their mixtures and/or ii) the fluorescent mixture for a polymerization kit.

Typically, the secondary fluorophore can be mixed at the same molar concentration with the i) monomers, oligomers or their mixtures and with ii) the fluorescent mixture for a polymerization kit, in order to prevent, if necessary, any phenomenon of dilution.

Typically, the polymerization solvent can be mixed with the monomers and oligomers.

The invention also relates to a ready-for-use kit with separate fluorophores for the manufacture of a polymerization composition (as defined in the present description, according to one or more of its alternative forms) comprising, separately for the purpose of the assembling thereof, the following components of the kit:
  i') a first polymerization mixture comprising monomers, oligomers or their mixtures intended to form at least one constituent polymer of a polymeric matrix as defined in the present description according to one or more of its alternative forms; and, in a molar concentration with respect to the total number of moles of primary fluorophore in the kit, from 80 molar % (more specifically 80.0 molar %) to 99.6 molar % (indeed even from 90 molar % (more specifically 90.0 molar %) to 99.1 molar %, indeed even from 96 molar % (more specifically 96.0 molar %) to 99.1 molar %) of a main primary fluorophore consisting of naphthalene;

ii') a second polymerization mixture comprising monomers, oligomers or their mixtures intended to form at least one constituent polymer of a polymeric matrix as defined in the present description according to one or more of its alternative forms; and, at a molar concentration with respect to the total number of moles of primary fluorophore in the kit, from 0.4 molar % to 20 molar % (more specifically 20.0 molar %) of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns and the fluorescence quantum yield in a nonpolar solvent of which is comprised between 0.2 and 1 (indeed even between 0.5 and 1).

Thus, according to specific embodiments of the invention:
the first polymerization mixture can comprise from 90 molar % (more specifically 90.0 molar %) to 99.1 molar % of the main primary fluorophore consisting of naphthalene and the second polymerization mixture can comprise from 0.9 molar % to 10 molar % (more specifically 10.0 molar %) of the additional primary fluorophore;
the first polymerization mixture can comprise from 96 molar % (more specifically 96.0 molar %) to 99.1 molar % of the main primary fluorophore consisting of naphthalene and the second polymerization mixture can comprise from 4 molar % (more specifically 4.0 molar %) to 0.9 molar % of the additional primary fluorophore.

According to another specific embodiment of the invention, the first polymerization mixture can comprise from 95.6 molar % to 99.1 molar % of the main primary fluorophore consisting of naphthalene and the second polymerization mixture can comprise from 0.9 molar % to 4.4 molar % of the additional primary fluorophore.

The ready-for-use kit with separate fluorophores can comprise:
a first compartment I') containing the first polymerization mixture;
a second compartment II') containing the second polymerization mixture.

The first polymerization mixture and/or the second polymerization mixture can comprise a secondary fluorophore as defined in the present description according to one or more of its alternative forms, a polymerization solvent or their mixture.

As regards the ready-for-use kit with mixed fluorophores of the ready-for-use kit with separate fluorophores:
the monomers, oligomers or their mixtures can represent from 75% by weight to 99% by weight of the components of the kit, and/or;
the main primary fluorophore can represent from 1% by weight to 25% by weight of the components of the kit, and/or;
it can further comprise at least one ancillary compartment each containing III) a crosslinking agent or a polymerization initiator.

The ready-for-use kit with mixed fluorophores or the ready-for-use kit with separate fluorophores can be such that the additional primary fluorophore can represent from 0.006% by weight to 5% by weight of the components of the kit. This is because the concentration of the main primary fluorophore in the first polymerization mixture can be comprised between 1% by weight and 25% by weight, with respect to the monomers or oligomers, this being the case in order to prevent an a posteriori phenomenon of exudation in the polymeric matrix, as indicated above. The concentration of the additional primary fluorophore in the second polymerization mixture can also be 25% by weight, with respect to the monomers or oligomers, i.e. a maximum concentration of 25%×20%=5% in the case of a mixture with the maximum of main primary fluorophore ([c]max=25%) with the maximum proportion of additional primary fluorophore ([c]max=20%). The same calculation for the minimum concentration is 1%×0.6%=0.006%.

The invention also relates to a ready-for-use kit with polymers for the manufacture of an extrusion mixture (as defined in the present description, according to one or more of its alternative forms) comprising, separately for the purpose of the assembling thereof, the following components of the kit:

i") polymerized ingredients (optionally in the form of granules) intended to form a polymeric matrix as defined in the present description according to one or more of its alternative forms;

ii") a fluorescent mixture for an extrusion kit comprising, at a molar concentration with respect to the total number of moles of primary fluorophore in the fluorescent mixture for an extrusion kit:

i) from 80 molar % (more specifically 80.0 molar %) to 99.6 molar % (indeed even from 90 molar % (more specifically 90.0 molar %) to 99.1 molar %, indeed even from 96 molar % (more specifically 96.0 molar %) to 99.1 molar %) of a main primary fluorophore consisting of naphthalene; and ii) from 0.4 molar % to 20 molar % (more specifically 20.0 molar %) of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns, and the fluorescence quantum yield in a nonpolar solvent of which is comprised between 0.2 and 1 (indeed even between 0.5 and 1).

Thus, according to specific embodiments of the invention:
the fluorescent mixture for an extrusion kit can comprise from 90 molar % (more specifically 90.0 molar %) to 99.1 molar % of the main primary fluorophore consisting of naphthalene and from 0.9 molar % to 10 molar % (more specifically 10.0 molar %) of the additional primary fluorophore;
the fluorescent mixture for an extrusion kit can comprise from 96 molar % (more specifically 96.0 molar %) to 99.1 molar % of the main primary fluorophore consisting of naphthalene and from 4 molar % (more specifically 4.0 molar %) to 0.9 molar % of the additional primary fluorophore.

According to another specific embodiment of the invention, the fluorescent mixture for an extrusion kit can comprise from 95.6 molar % to 99.1 molar % of the main primary fluorophore consisting of naphthalene and from 0.9 molar % to 4.4 molar % of the additional primary fluorophore.

The polymerized ingredients have the same chemical composition as the polymeric matrix. They differ from it essentially in the fact that they are not in the bulk form, like the polymeric matrix, but in the dispersed form, for example in the form of granules.

The ready-for-use kit with polymers can comprise:
a first compartment I") containing the polymerized ingredients;
a second compartment II") containing the liquid fluorescent mixture for an extrusion kit.

The ready-for-use kit with polymers can be such that a secondary fluorophore as defined in the present description according to one or more of its alternative forms, a polymerization solvent or their mixture is mixed with i) the polymerized ingredients and/or ii) the fluorescent mixture for an extrusion kit.

The ready-for-use kit with polymers can also further comprise:
a secondary compartment containing the secondary fluorophore and/or a polymerization solvent.

Each kit can comprise instructions giving the chart of the mixture to be produced between the main primary fluorophore and the additional primary fluorophore in order to obtain the desired fluorescence decay constant.

The components of each kit can be assembled, for the purpose of the subsequent manufacture of the polymerization composition of the invention, for the purpose among others of a use which is simultaneous, separate or spread out over time.

Other subject matters, characteristics and advantages of the invention will now be specified in the description which follows of specific embodiments of the invention, given by way of illustration and without limitation, with reference to the appended FIGS. 1 to 8.

BRIEF DESCRIPTION OF THE FIGURES

FIG. 1 represents a table in which the fluorescence decay constant is measured for hybrid materials which differ in the proportion between the main primary fluorophore and the additional primary fluorophore and in the optional addition of a secondary fluorophore, and also, by way of comparison, for a material not containing an additional primary fluorophore.

By way of comparison.

DESCRIPTION OF SPECIFIC EMBODIMENTS

Figure 2A:
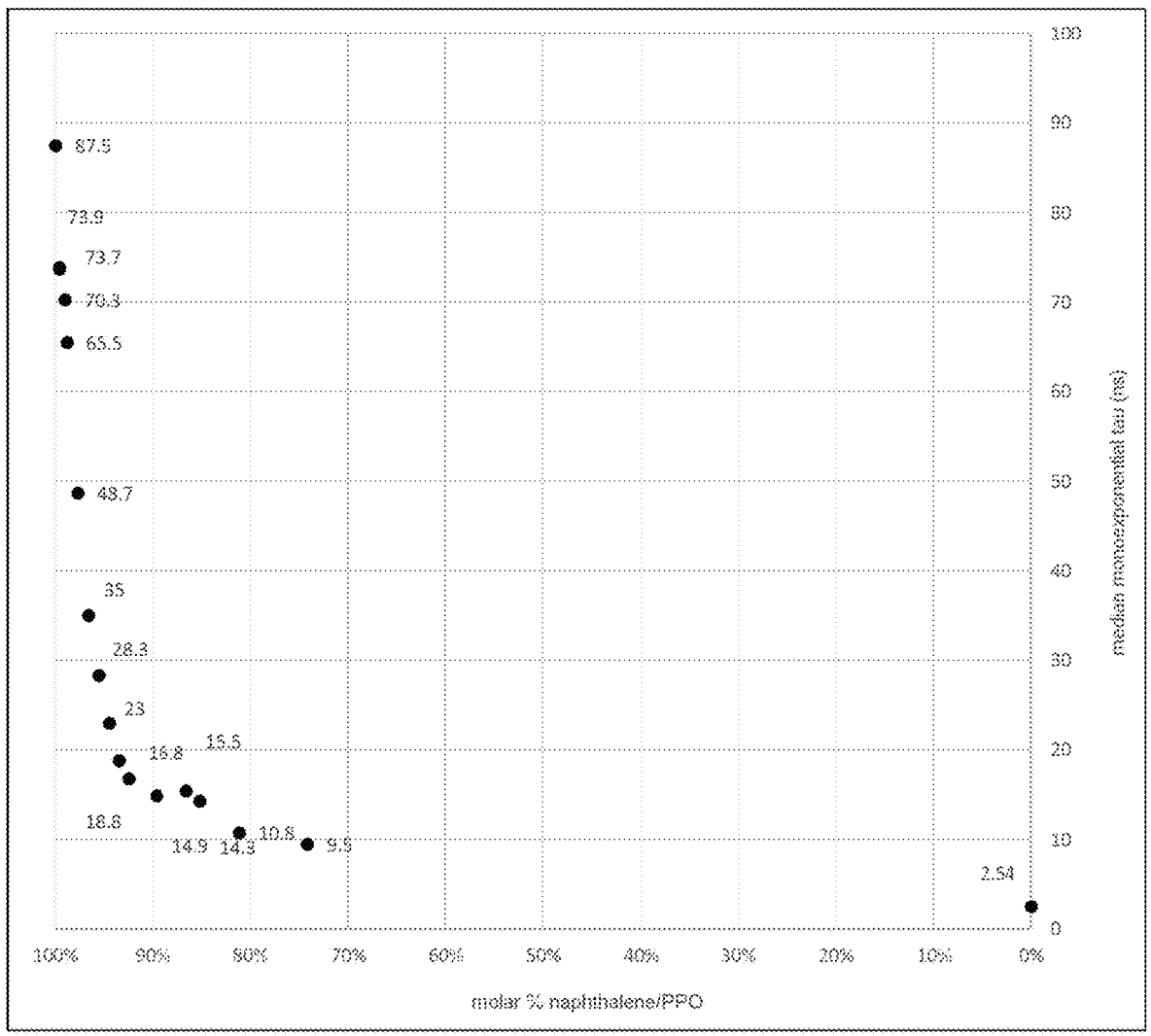
FIG. 2A represents the change in the fluorescence decay constant median monoexponential tau as a function of the molar proportion of the main primary fluorophore to the additional primary fluorophore according to the data of FIG. 1. It can represent a chart appearing in the instructions delivered with the ready-for-use kit.

Unless otherwise indicated, the examples are carried out at atmospheric pressure and ambient temperature.

1. Manufacture of a Hybrid Material for Plastic Scintillation Measurement According to the Invention.

1.1. Example 1 of Manufacture of a Plastic Scintillator with a Secondary Fluorophore.

A liquid mixture comprising fluorescent molecules (5% by weight (3.624 g) of naphthalene as main primary fluorophore+0.2% by weight (183 mg) of 2,5-diphenyloxazole (PPO) as additional primary fluorophore and 0.02% by weight (15.2 mg) of 9,10-diphenylanthracene (DPA) as secondary fluorophore), to which styrene (80 ml, i.e. 94.78% by weight) is subsequently added, is introduced into a single-necked round-bottomed flask dried beforehand under an inert argon atmosphere.

After five degassings under cold conditions under vacuum ("freeze-pump-thaw" method), the polymerization medium obtained, returned to ambient temperature, is poured into a mold capable of giving the final shape to the plastic scintillator.

After heating the sealed mold under an inert argon atmosphere at 140° C. for five days, the plastic scintillator is removed from the mold, precision ground and then polished.

1.2. Example 2 of Manufacture of a Plastic Scintillator with a Secondary Fluorophore.

A liquid mixture comprising fluorescent molecules (5% by weight of naphthalene (3.624 g)+0.2% by weight of 2,5-diphenyloxazole (PPO, 183 mg) as primary fluorophores and 0.02% by weight of 1,4-bis(4-methyl-5-phenyl-2-oxazolyl)benzene (dimethylPOPOP, 15.2 mg) as secondary fluorophore), to which styrene (80 ml, 94.78% by weight) is subsequently added, is introduced into a single-necked round-bottomed flask dried beforehand under an inert argon atmosphere.

After five degassings under cold conditions under vacuum, the polymerization medium obtained, returned to ambient temperature, is poured into a mold.

After heating the sealed mold under an inert argon atmosphere at 140° C. for five days, the plastic scintillator is removed from the mold, precision ground and then polished.

1.3. Example 3 of Manufacture of a Plastic Scintillator with a Crosslinked Polymeric Matrix and a Secondary Fluorophore.

A liquid mixture comprising fluorescent molecules (5% by weight of naphthalene (3.624 g)+0.2% by weight of 2,5-diphenyloxazole (PPO, 183 mg) as primary fluorophores and 0.02% by weight of 9,10-diphenylanthracene (DPA, 15.2 mg) as secondary fluorophore), to which 80% by weight of styrene (64 ml) and then 14.78% by weight of 1,4-butanediyl dimethacrylate (10.3 ml) as crosslinking agent are subsequently added, is introduced into a single-necked round-bottomed flask dried beforehand under an inert argon atmosphere.

After five degassings under cold conditions under vacuum, the polymerization medium obtained, returned to ambient temperature, is poured into a mold.

After heating the sealed mold under an inert argon atmosphere at 65° C. for ten days, the plastic scintillator is removed from the mold, precision ground and then polished.

2. Manufacture of a Range of Plastic Scintillators with a Variable Proportion Between the Primary Fluorophores.

Plastic scintillators are manufactured according to the characteristics specified in the table of FIG. 1 according to a manufacturing process similar to that disclosed in the preceding examples.

They differ in the chemical composition of the polymeric matrix (St=polystyrene; St/1,4=mixture of styrene and of 1,4-butanediyl dimethacrylate which are polymerized in a proportion by weight between the two monomers respectively of 5 to 1) and in the molar ratio of the main primary fluorophore (naphthalene) to the additional primary fluorophore (2,5-diphenyloxazole=PPO). The concentration by weight of each primary fluorophore is shown as percentage with respect to the total weight of the plastic scintillator, the remainder thus being constituted by the percentage by weight of the polymeric matrix, of the other primary fluorophore, and also by a constant concentration of 0.02% by weight of 9,10-diphenylanthracene (9,10-DPA) added as secondary fluorophore, not shown in the table of FIG. 1.

The decay constant tau of the fluorescence is measured by time-correlated single photon counting as described above. It is in this instance generally obtained by adjustment of biexponential type of the values obtained, weighting factors for each exponential component being shown as percentage in brackets. In order to facilitate the comparison between the different plastic scintillators, the biexponential tau is converted into median monoexponential tau in accordance with the equation below, for which the quality of the adjustment of the measurement with respect to the light pulse is evaluated by the chi squared, which should ideally be as close as possible to 1. Alternatively, commercial items of time-correlated single photon counting equipment automatically calculate the median monoexponential tau, indeed even the biexponential tau, from the data recorded.

The median decay constant monoexponential tau of the fluorescence can be calculated from the following formula:

$$\tau_{median} = \tau_{fast} \times \%_{fast} + \tau_{slow} \times \%_{slow}$$

The percentages "% fast" and "% slow" represent the respective weights of the fast and slow decay. They are adjusted in order to give the best possible description of the median decay. Their sum is equal to 100%.

Thus, FIG. 2A represents the change in the fluorescence decay constant median monoexponential tau (median monoexponential tau) as a function of the naphthalene/PPO molar ratio. It clearly shows the continuous change in the fluorescence decay constant as a function of the molar ratio of the main primary fluorophore to the additional primary fluorophore. This change has the form of a decreasing exponential which is the signature of a synergy between the main primary fluorophore and the additional primary fluorophore. In the absence of such a synergy, the change in the time constant as a function of the molar ratio would be in the form of a linear line which would directly connect the value at 100% and at 0%, reflecting the simple gradual replacement of one primary fluorophore by another.

By way of comparison, the main primary fluorophore according to FIG. 2A of the naphthalene/PPO combination according to the invention was replaced by pyrene, a compound which belongs to the family of the fused aromatic compounds, just like naphthalene, as is shown by the molecular structures below:

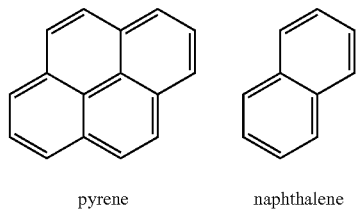

pyrene   naphthalene

Figure 2B:
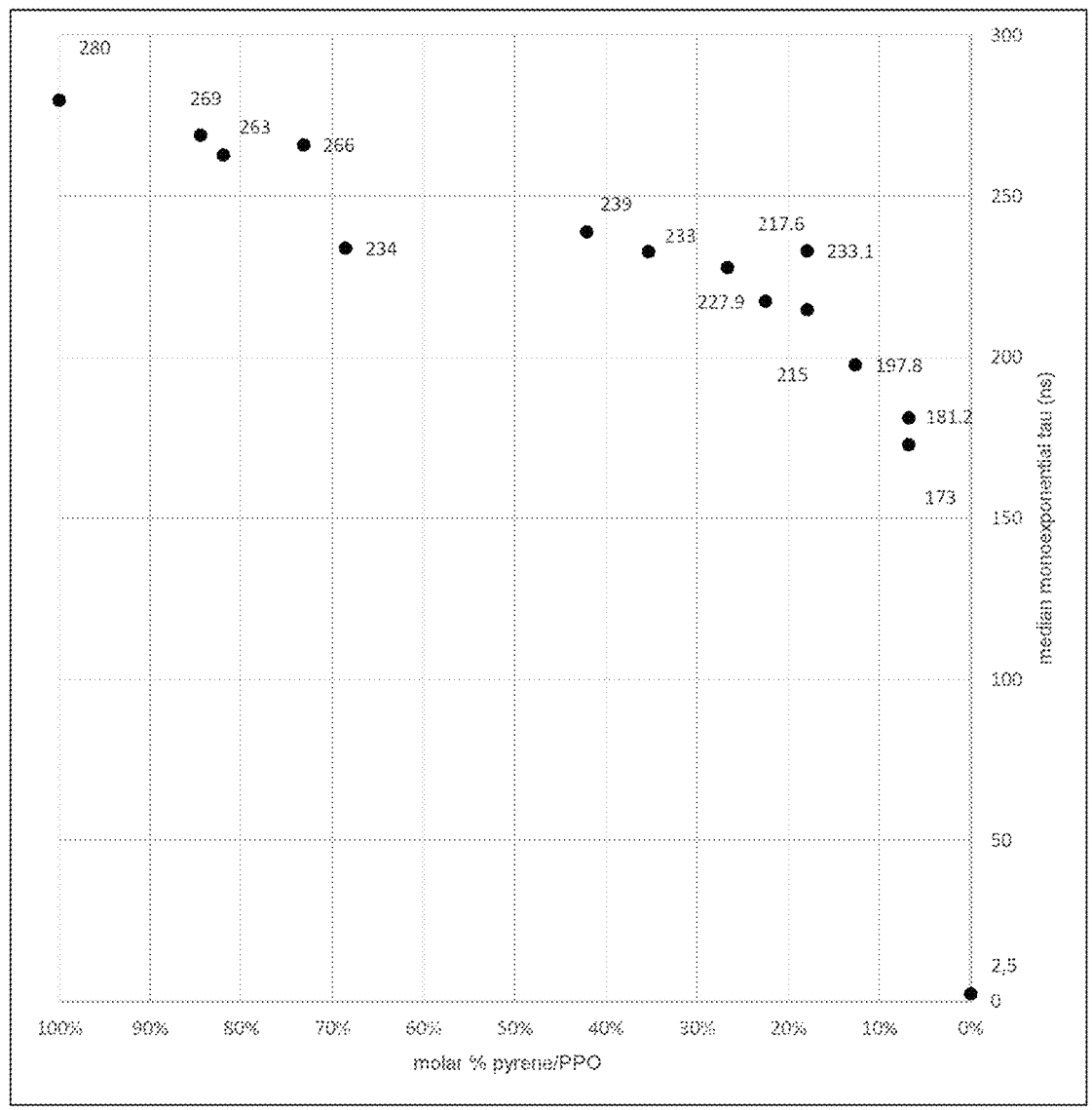
FIG. 2B represents the change in the fluorescence decay constant median monoexponential tau as a function of the molar proportion of a main primary fluorophore different from that of the invention to an additional primary fluorophore.

The change in the fluorescence decay constant median monoexponential tau (median monoexponential tau) is studied as a function of the pyrene/PPO molar ratio in a similar way to the study of FIG. 2A. The result is illustrated by FIG. 2B, which shows that this change absolutely does not have the form of a decreasing exponential: there is thus no synergistic effect between the pyrene and the PPO, unlike the combination of the main primary fluorophore and of the additional primary fluorophore according to the invention.

Figure 3:
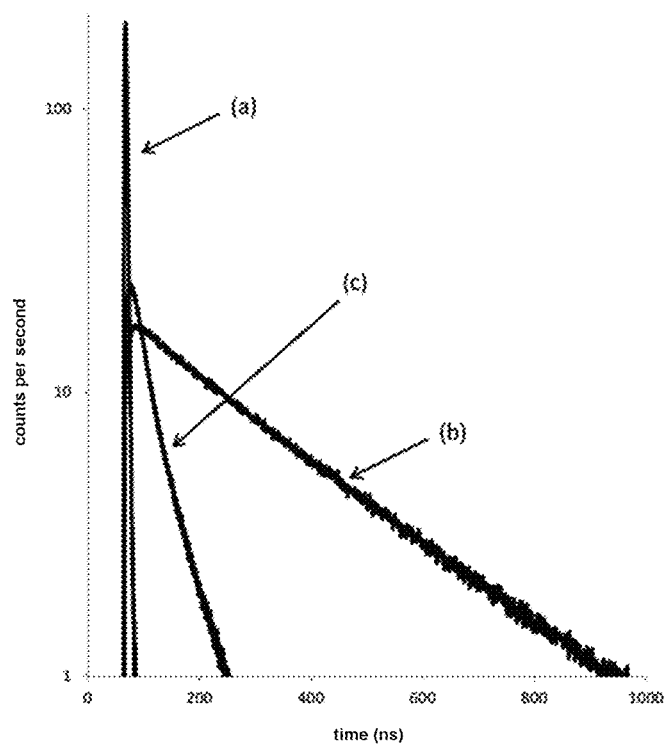
FIG. 3 represents the pulse profile for different plastic scintillators, namely the change in their responses in number of counts/seconds as a function of the time, expressed in nanoseconds. A pulse recording profile is superimposed on these profiles.

Another advantage of the use of a hybrid material for the plastic scintillation measurement is demonstrated by FIG. 3, which illustrates the type of response pulse obtained for a plastic scintillator referenced by an index in the figure:

fast (index a): "Eljen EJ-200" reference scintillator sold by the Eljen Technology firm;

slow (index b): "Eljen EJ-240" reference scintillator sold by the Eljen Technology firm;

hybrid (index c): comprising the hybrid material according to the invention.

The recording profile used (500 ns with a noise of 10 counts/second) is superimposed on the pulses of these three plastic scintillators.

FIG. 3 demonstrates the advantages of a phoswich plastic scintillator comprising a fast compartment and a hybrid compartment according to the invention, in comparison with a phoswich plastic scintillator comprising a fast compartment and a slow compartment: for an electronic noise for example estimated at 10 counts per second, the hybrid pulse of the hybrid compartment has a better signal-to-noise ratio than the slow pulse of the slow compartment, by virtue of the greater amplitude of the hybrid pulse.

The acquisition is carried out by the opening of a time window for recording these pulses. As indicated above, the duration of this recording is generally chosen in order to be from 6 to 10 times greater than the highest fluorescence decay constant, this decay constant corresponding, for each pulse, to the width on the abscissa of the pulse, expressed in nanoseconds. In the case of high count rates, such as, for example, when a radioactive source of high activity is brought into the presence of the phoswich device, the use of a slow compartment thus involves using a much longer recording window: several pulses can then coexist in the same time window (pile-up phenomenon), which is then reflected by acquisition errors in the absence of discrimination of these pulses.

These properties of a hybrid compartment are thus particularly advantageous for the discrimination of the beta particle in an environment of gamma rays with a "phoswich" device comprising a hybrid compartment (in particular when it is the thinnest compartment) and a fast compartment, each of these two compartments respectively detecting the beta particle and the gamma radiation.

3. Example of Qualitative or Quantitative Measurement of a Radioactive Substance in Plastic Scintillation According to the Measurement Method of the Invention.

3.1. Measurement Protocol.

A plastic scintillator comprising the hybrid material of the invention in which a secondary fluorophore is incorporated is connected by means of optical grease to a photomultiplier tube which performs the function of photo-detector of an electronic acquisition module.

Subsequent to its exposure to the radioactive substance, the plastic scintillator emits scintillation photons which are converted into an electrical signal by the photomultiplier tube supplied with high voltage.

The electrical signal is subsequently acquired and then analyzed with an oscilloscope, spectrometry software or an electronic acquisition board. The data thus collected is subsequently processed by computer.

This analysis results in an energy spectrum histogram representing, on the abscissa, the channels (derived from an output energy) and, on the ordinate, the number of counts/second. After calibration with a gamma-emitting source of known energy, the energy of the radioactive substance to be measured is determined.

3.2. Quantitative Measurement with the Scintillator.

On the basis of this measurement protocol, a quantitative measurement is carried out with a chlorine-36 beta radioactive source of 4n activity equal to 6 kBq. This source is placed on the upper part of the plastic scintillator.

A cylindrical plastic scintillator of circular section, with a diameter of 49 mm and height of 35 mm (reference F30B of the table of FIG. 1) is coupled with Rhodorsil RTV141A optical grease to the photocathode of a photomultiplier (Hamamatsu H1949-51 model) supplied with a high voltage (Ortec 556 model). The signal leaving the photomultiplier is recovered and then digitized by an electronic board specific to the inventor. This board can be replaced by another equivalent electronic board (for example CAEN DT5730B model) or an oscilloscope (for example Lecroy Waverunner 640Zi model).

In a first step, an energy calibration of the system (scintillator+photomultiplier) is carried out by means of 2 radioactive sources: one emitting gamma rays in the [0-200 keV] range and the other in the [500-1.3 MeV] range. This energy calibration is carried out by locating the channel corresponding to 80% of the amplitude of the Compton edge.

For example, if the ordinate of the Compton edge corresponds to 100 counts per second, the abscissa on the falling slope of the Compton edge at 80 counts per second associates the energy of the Compton edge (in keV) with the channel.

In a second step, this calibration having been carried out, the chlorine-36 beta source is joined to the upper face of the plastic scintillator. The analysis of the energy spectrum gives a read activity of 2.1 kBq (and thus an intrinsic efficiency according to which 70% of the incident radiation is measured) and a photoelectric peak centered at approximately 250 keV.

Figure 4:
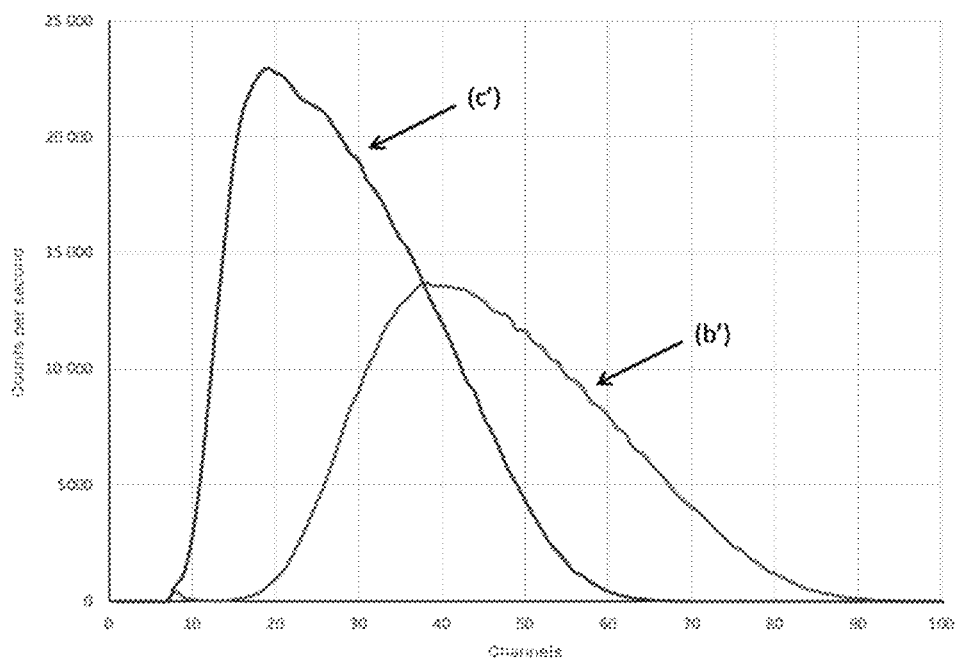
FIG. 4 represents the energy spectra of a plastic scintillator of the invention and of a commercial slow plastic scintillator.

The energy spectrum of the hybrid plastic scintillator obtained is represented in FIG. 4 (index (c')). By way of comparison, it is superimposed on that of a slow plastic scintillator (Eljen EJ-240 slow, sold by the Eljen Technology firm—index (b') in FIG. 4), the measured intrinsic efficiency of which is 54%.

4. Geometries of a Device for Plastic Scintillation Detection According to the Invention.

Such a device is described with reference to FIGS. 5 and 6, which represent, along a longitudinal axis with reference to the radiation R, sectional drawings of a plastic scintillator of parallelepipedal shape of "phoswich" type. Thus, unless otherwise indicated, each part of the device represented here is of parallelepipedal shape. The same numerical references denote the same elements in these two figures.

4.1. Device with a Bonding Layer.

Figure 5:
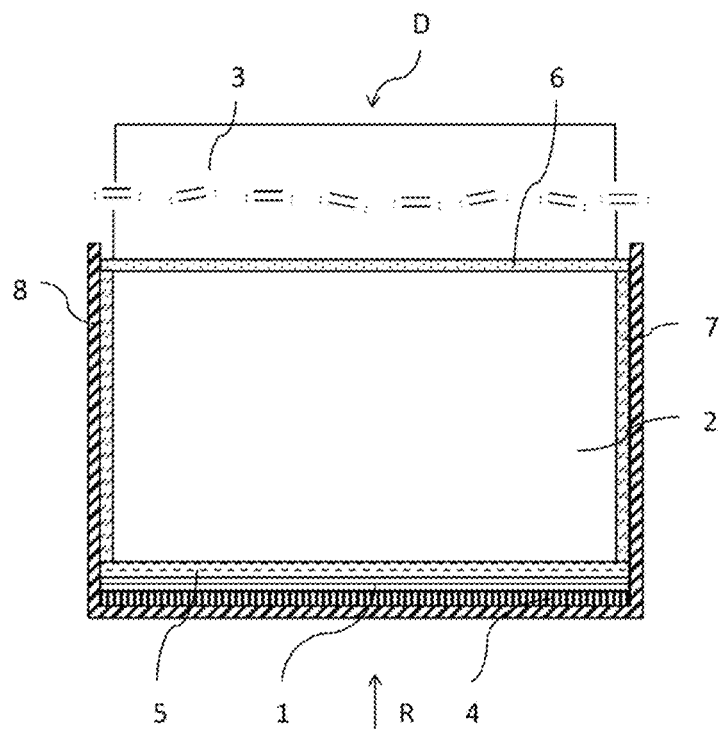
FIGS. 5 and 6 represent a cross-sectional view of a device of "phoswich" type for plastic scintillation detection according to the invention, respectively without and with a bonding layer.

According to a first embodiment illustrated by FIG. 5, the plastic scintillation detection device D of the invention comprises a part according to the invention which is a first hybrid plastic scintillator element 1 constituted, completely or partially, of the hybrid material of the invention and a second fast plastic scintillator element 2. These elements are respectively located upstream and downstream with respect to the direction R of propagation of the incident radiation (or of the incident particle) on the phoswich scintillator. Conventionally, they are thus denoted in the continuation of the description by "upstream hybrid scintillator 1" and "downstream fast scintillator 2". In the configuration illustrated by FIG. 5, the upstream hybrid scintillator 1 is referred to as "thin", as it has a lower longitudinal thickness than the downstream fast scintillator 2, referred to as "thick. The device for plastic scintillation detection of the invention exhibiting all these characteristics shows a discrimination between the gamma rays and the beta particles which is improved.

The upstream hybrid scintillator 1 and the downstream fast scintillator 2 are optionally contained in a shell 8 which can constitute the housing or the frame of the device. They are attached to one another with an optical interface layer forming a bonding layer 5.

The bonding layer 5 is generally a layer distinct from the upstream hybrid scintillator 1 and from the downstream fast scintillator 2, for example an attaching layer. However, it can be a layer composed of an intermediate material resulting from the melting of the upstream hybrid scintillator material 1 and of the downstream fast scintillator 2, as for plastic scintillation detectors comprising two scintillators bonded to one another by thermomechanical pressing.

The bonding layer 5 can be an optical layer which is transparent to luminescent radiation. It can be composed of a bonding substance chosen from greases, adhesives, gels, optical cements, elastomeric compounds or silicone compounds ordinarily employed in the optical field. Such a substance allows the light radiation leaving the upstream scintillator to pass.

A photodetector 3 (such as, for example, a photo-multiplier) is attached to the downstream fast scintillator with an optical interface layer 6. It is capable of collecting the radioluminescent radiation resulting from the contact of an ionizing particle or of ionizing radiation with the scintillators 1 and 2.

The face of the upstream hybrid scintillator 1 which first receives the incident radiation according to the direction of propagation R to be detected is covered with a metal layer 4 which is in this instance thin. This metal layer constitutes an inlet window with which the incident radiation (or the incident particle) comes into contact, while preventing the ambient light from also coming into contact with the upstream scintillator by isolating it from the light. The side faces of the upstream and downstream scintillators are covered with a light reflector or diffuser 7 composed of a reflecting substance comprising, for example, aluminum (aluminized Mylar, aluminum paper, and the like) or composed of a scattering substance comprising, for example, Teflon, a paint based on titanium oxide $TiO_2$, a paint based on magnesium oxide MgO or Millipore filter paper.

4.2. Device without a Bonding Layer.

Figure 6:
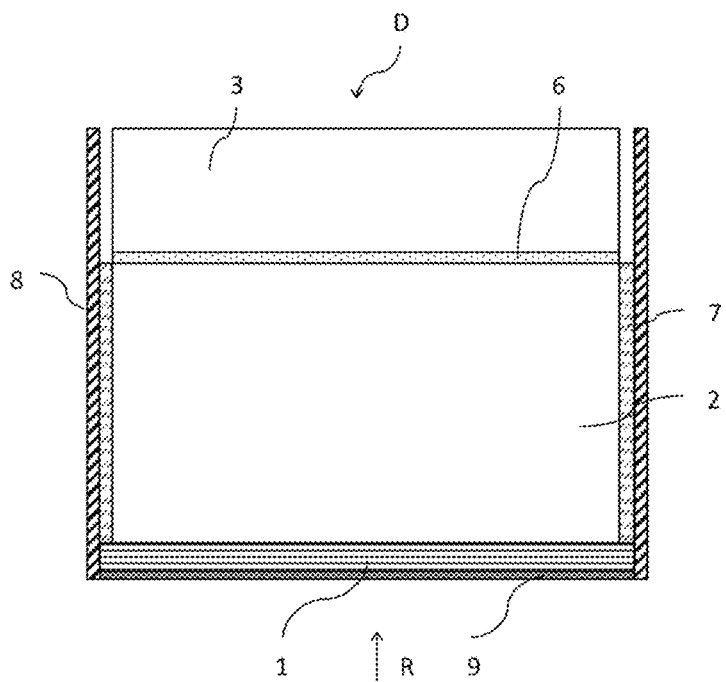

According to a second embodiment illustrated by FIG. 6, the plastic scintillation detection device D of the invention has a structure as described in the document WO 2013076279 [reference 11]. It thus does not comprise a bonding layer, such as the optical interface layer 5 described in FIG. 5. The device for plastic scintillation detection without a bonding layer of the invention nevertheless differs from that described in the reference [8] in that it comprises a first hybrid plastic scintillator element constituted, completely or partially, of the hybrid material of the invention.

The plastic scintillation detection device D of the invention without the bonding layer illustrated by FIG. 6, comprises a first hybrid plastic scintillator element 1 constituted, completely or partially, of the hybrid material of the invention and a second fast plastic scintillator element 2. These elements are respectively located upstream and downstream, with respect to the direction R of propagation of incident radiation (or of the incident particle) on the phoswich scintillator. In the configuration illustrated by FIG. 5, the upstream hybrid scintillator 1 is said to be "thin" as it has a lower longitudinal thickness than the downstream fast scintillator 2, said to be "thick". The device for plastic scintillation detection of the invention exhibiting all these characteristics shows a discrimination between the gamma rays and the beta particles which is improved.

The upstream hybrid scintillator 1 and the downstream fast scintillator 2 are in direct contact and are attached to one another by an autogenous coupling process. In this coupling process, a first crosslinked plastic scintillator is prepared and then polymerized. After this first solid formulation, the monomer solution containing the fluorescence mixture in order to manufacture the second scintillator is poured onto the first scintillator, and the assembly is subsequently heated.

The scintillators 1 and 2 are optionally contained in a shell 8 which can constitute the housing or the frame of the device.

A photodetector 3 (such as, for example, a photo-multiplier) is attached to the downstream fast scintillator with an optical interface layer 6. It is capable of collecting the radioluminescent radiation resulting from the contact of an ionizing particle or of ionizing radiation with the scintillators 1 and 2.

The face of the upstream hybrid scintillator 1 which first receives the incident radiation (or the incident particle), according to the direction of propagation R, to be detected is covered with a light-opaque layer 9. This opaque layer 9 constitutes an inlet window with which the incident radiation comes into contact, while limiting the contact of the ambient light with the upstream scintillator.

The side faces of the upstream and downstream scintillators are covered with a light reflector or diffuser 7. The light-opaque layer 9 is permeable to the passage of beta radiation and gamma radiation. It is composed of an opaque substance, such as, for example, Mylar.

Figure 7:
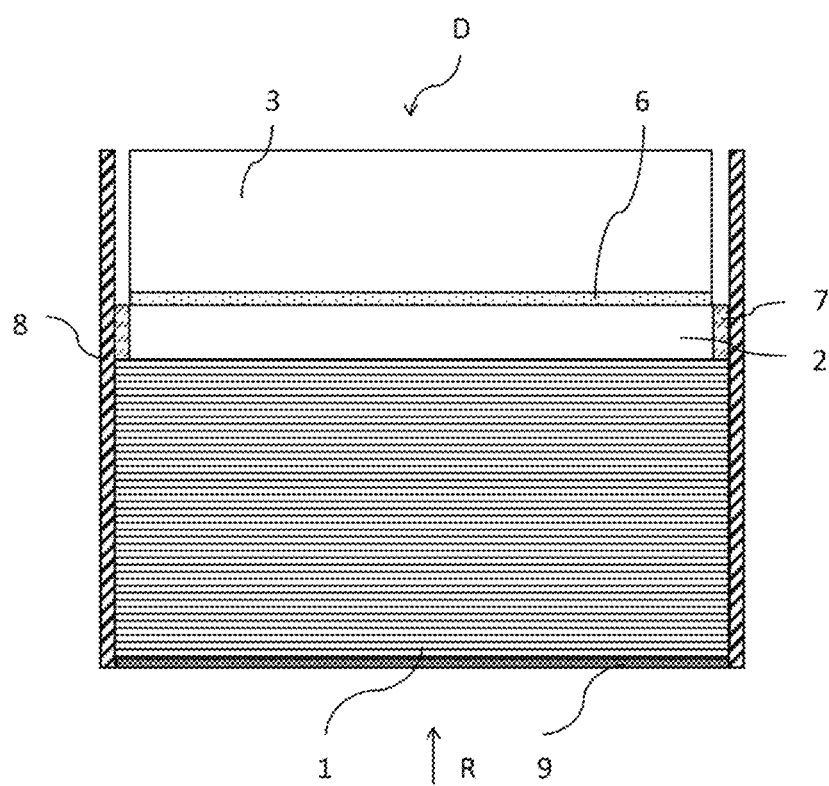
FIG. 7 represents an alternative form of the device of FIG. 6.

As indicated above, the upstream hybrid scintillator 1 can have a lower thickness than the downstream fast scintillator 2. Such a configuration is represented in FIG. 7.

4.3. Scintillating Optical Fiber.

Figure 8:
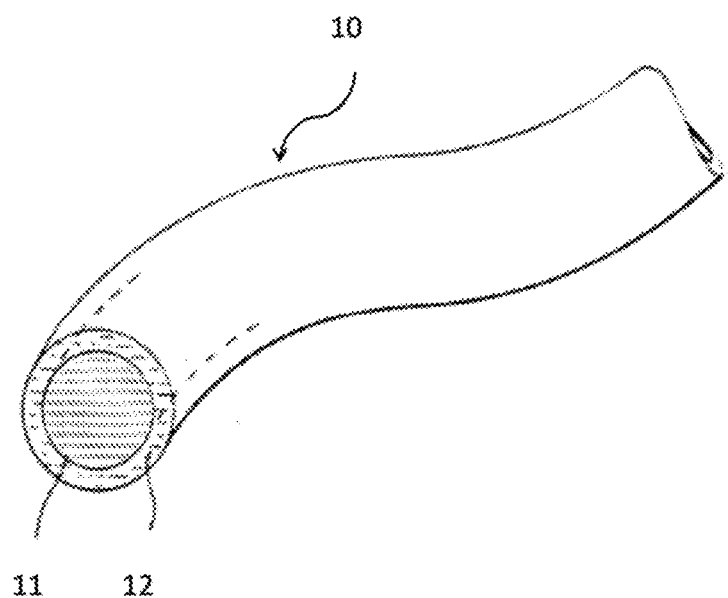
FIG. 8 represents the diagrammatic view of a scintillating optical fiber provided with a sheath.

FIG. 8 represents a scintillating optical fiber 10 of cylindrical section. It comprises a polymer fiber 11 composed, completely or partially, of the hybrid material of the invention. The polymer fiber 11 constituting the internal core of the fiber is covered with a sheath 12 covering the polymer fiber and composed, completely or partially, of a sheathing material.

The present invention is not limited to the embodiments described and represented, and a person skilled in the art will know how to combine them and to contribute thereto with his general knowledge of numerous alternative forms and modifications.

The invention is applicable to the fields where scintillators are used, in particular:

in the industrial field, for example for the measurement of physical parameters of parts during manufacture, for the nondestructive inspection of materials, for the monitoring of radioactivity at the entrance and exit points of sites and for the monitoring of radioactive waste,
- in the geophysical field, for example for the evaluation of the natural radioactivity of soils,
- in the field of fundamental physics and in particular nuclear physics,
- in the field of the safety of goods and people, for example for the safety of critical infrastructures, the monitoring of moving goods (luggage, containers, vehicles, and the like), and also for the protection from radiation of workers in the industrial, nuclear and medical sectors,
- in the field of medical imaging.

REFERENCES CITED

[1] Moser, S. W.; Harder, W. F.; Hurlbut, C. R.; Kusner, M. R., "Principles and practice of plastic scintillator design", Radiat. Phys. Chem., 1993, vol. 41, No. 1/2, 31-36.
[2] Bertrand, G. H. V.; Hamel, M.; Sguerra, F., "Current status on plastic scintillators modifications", Chem. Eur. J., 2014, 20, 15660-15685.
[3] Wilkinson, D. H., "The Phoswich—A Multiple Phosphor", Rev. Sci. Instrum., 1952, 23, 414-417.
[4] M. Wahl, "Time-Correlated Single Photon Counting", Technical instructions from PicoQuant, 2014.
[5] D. V. O'Connor, D. Phillips, Time Correlated Single Photon Counting, Academic Press, New York, 1984, pages 25 to 34.
[6] Rohwer, L. S., Martin, J. E., "Measuring the absolute quantum efficiency of luminescent materials", J. Lumin., 2005, 115, pages 77-90.
[7] Velapoli, R. A.; Mielenz, K. D., "A Fluorescence Standard Reference Material: Quinine Sulfate Dihydrate", Appl. Opt., 1981, 20, 1718.
[8] WO 2013076281.
[9] Techniques de l'ingenieur, Extrusion—extrusion monovis (partie 1), Reference AM3650, publication of 2002.
[10] Techniques de l'ingenieur, Mesures de radioactivite par scintillation liquide, Reference p2552, publication of Oct. 3, 2004.
[11] WO 2013076279.

The invention claimed is:

1. Hybrid material for plastic scintillation measurement comprising:
   a polymeric matrix; and
   a fluorescent mixture incorporated in the polymeric matrix and comprising, in a molar concentration with respect to the total number of moles of primary fluorophores in the incorporated fluorescent mixture:
   i) from 95.6 molar % to 99.1 molar % of a main primary fluorophore consisting of naphthalene; and
   ii) from 0.9 molar % to 4.4 molar % of an additional primary, fluorophore, the centroid of the light absorption spectrum and of the fluorescence emission spectrum of which have respectively a wavelength comprised between 250 nm and 340 nm and comprised between 330 nm and 380 nm, the fluorescence decay constant of which is comprised between 1 ns and 10 ns and the fluorescence quantum yield in a nonpolar solvent of which is comprised between 0.2 and 1.

2. Hybrid material according to claim 1, wherein the incorporated fluorescent mixture comprises from 96 molar % to 99.1 molar % of the main primary fluorophore.

3. Hybrid material according to claim 1, wherein the incorporated fluorescent mixture further comprises a secondary fluorophore.

4. Hybrid material according to claim 3, wherein the secondary fluorophore is at a concentration by weight with respect to the weight of the hybrid material which is comprised between 0.002% and 0.5% by weight.

5. Process for the manufacture of a hybrid material according to claim 1, by polymerization via a polymerization medium, the process comprising the following successive steps:
 a) having available a polymerization medium comprising:
  monomers, oligomers or their mixtures intended to form at least one constituent polymer of said polymeric matrix;
  a liquid fluorescent mixture comprising, in a molar concentration with respect to the total number of moles of primary fluorophores in the liquid fluorescent mixture:
   i) from 95.6 molar % to 99.1 molar % of a main primary fluorophore consisting of naphthalene; and
   ii) from 0.9 molar % to 4.4 molar % of an additional primary fluorophore, the centroid of the light absorption spectrum and of the fluorescence emission spectrum of which have respectively a wavelength comprised between 250 nm and 340 nm and comprised between 330 nm and 380 nm, the fluorescence decay constant of which is comprised between 1 ns and 10 ns, and the fluorescence quantum yield in a nonpolar solvent of which is comprised between 0.2 and 1; and
 b) polymerizing the polymerization medium in order to obtain the hybrid material.

6. Part for plastic scintillation detection composed, completely or partially, of a hybrid material according to claim 1.

7. Part for plastic scintillation detection according to claim 6, wherein the part has a:
 parallelepipedal shape and is a plastic scintillator compartment capable of being incorporated in a device for plastic scintillation detection; or
 cylindrical shape and is a scintillating optical fiber comprising a polymer fiber composed, completely or partially, of the hybrid material and provided or not provided with a sheath covering the polymer fiber and composed, completely or partially, of a sheathing material for an optical fiber, the refractive index of which is less than that of the hybrid material, the hybrid material comprising the polymeric matrix, wherein the polymeric matrix is constituted, completely or partially, of at least one polymer which is not crosslinked.

8. Process for the manufacture by extrusion of a part for plastic scintillation detection and composed; completely or partially, of a hybrid material, the part being in accordance with claim 6, the process comprising the following successive steps:
 a') having available an extrusion mixture comprising:
  polymerized ingredients intended to form said polymeric matrix;
  a fluorescent mixture for extrusion comprising, in a molar concentration with respect to the total number of moles of primary fluorophores in the fluorescent mixture for extrusion:
   i) from 95.6 molar % to 99.1 molar % of a main primary fluorophore consisting of naphthalene; and
   ii) from 0.9 molar % to 4.4 molar % of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns and the fluorescence quantum yield in a nonpolar solvent of which is comprised between 0.2 and 1; and
 b') under an extrusion atmosphere at an extrusion temperature comprised between 70° C. and 200° C., extruding the extrusion mixture through a die in order to obtain the part composed, completely or partially, of a hybrid material.

9. Process for the manufacture by polymerization of a part for plastic scintillation detection and composed, completely, or partially, of a hybrid material, the part being in accordance with claim 6, the process comprising at least one polymerization via a polymerization medium according to the following successive steps:
 a) in a first mold, having available a first polymerization medium comprising:
  monomers, oligomers or their mixtures intended to form at least one constituent polymer of said polymeric matrix; and
  a liquid fluorescent mixture comprising, in a molar concentration with respect to the total number of moles of primary fluorophores in the liquid fluorescent mixture:
   i) from 95.6 molar % to 99.1 molar % of a main primary fluorophore consisting of naphthalene; and
   ii) from 0.9 molar % to 4.4 molar % of an additional primary fluorophore, the centroid of the light absorption spectrum and of the fluorescence emission spectrum of which respectively have a wavelength comprised between 250 nm and 340 nm and comprised between 330 nm and 380 nm, the fluorescence decay constant of which is comprised between 1 ns and 10 ns and the fluorescence quantum yield in a nonpolar solvent of which is comprised between 0.2 and 1; and
 b) polymerizing the first polymerization medium in order to directly obtain the part or a preform of the part which is subsequently modified in order obtain the part.

10. Device for plastic scintillation detection comprising a part according to claim 6 for plastic scintillation detection as a hybrid plastic scintillator element.

11. Device for plastic scintillation detection according to claim 10, wherein the part has a parallelepipedal or cylindrical shape; the part of cylindrical shape being an scintillating optical fiber comprising a polymer fiber composed, completely or partially, of the hybrid material and provided or not provided with a sheath covering the polymer fiber and composed, completely or partially, of a sheathing material for an optical fiber, the refractive index of which is less than that of the hybrid material, the hybrid material comprising the polymeric matrix, wherein the polymeric matrix is constituted, completely or partially, of at least one polymer which is not crosslinked.

12. Device for plastic scintillation detection according to claim 10, wherein the hybrid plastic scintillator element is a first hybrid plastic scintillator element, the device further comprising a second fast plastic scintillator element, the fluorescence decay constant of which is less than that of the first hybrid plastic scintillator element, these plastic scintillator elements forming a plastic scintillator assembly, the device being for example a device of phoswich type.

13. Device for plastic scintillation detection according to claim 12, wherein the plastic scintillator elements have different thicknesses, so that the device comprises a thin plastic scintillator element and a thick fast scintillator element the thin first hybrid plastic scintillator element being upstream and the thick second fast plastic scintillator element being downstream, with reference to the direction R of propagation of the ionizing radiation or of the ionizing particle with regard to the device.

14. Device for plastic scintillation detection according to claim 12, wherein the second fast plastic scintillator element comprises said polymeric matrix and a fast primary fluorophore chosen from 2,5-diphenyloxazole (PPO), para-terphenyl (pTP), meta-terphenyl (mTP), biphenyl, 2-phenyl-5-(4-biphenylyl)-1,3,4-oxadiazole (PBD), 2-(4'-(t-butyl)phenyl)-5-(4"-biphenylyl)-1,3,4-oxadiazole (butyl-PBD), anthracene or their mixtures.

15. Device for plastic scintillation detection according to claim 10, wherein the part comprises a single hybrid plastic scintillator element.

16. Item of equipment for plastic scintillation detection comprising a device according to claim 10, constituted by a portable instrument for the detection of ionizing radiation, a walk-through scanner or a CCD detector.

17. Process for the manufacture of a device for plastic scintillation detection according to claim 10, wherein the part as hybrid plastic scintillator element is coupled to the electronic acquisition module, so that the module is capable of collecting the radioluminescent radiation emitted by the part when the latter is brought into contact with an ionizing radiation or an ionizing particle.

18. Plastic scintillation measurement method, the method comprising the following successive steps:
   i) a device according to claim 10 is brought into contact with an ionizing radiation or an ionizing particle in order for the part comprised in the device to emit radioluminescent radiation; and
   ii) the radioluminescent radiation is measured with the electronic acquisition module of the device.

19. Scintillation measurement method according to claim 18, wherein the duration of the decay in the radioluminescent radiation measured is comprised between 25 ns and 75 ns.

20. Scintillation measurement method according to claim 18, wherein the ionizing radiation or the ionizing particle originates from a radioactive substance which emits gamma rays and beta particles which are distinguished during the measurement step ii).

* * * * *